(12) United States Patent
Yoshioka

(10) Patent No.: US 8,068,055 B2
(45) Date of Patent: *Nov. 29, 2011

(54) POSITIONING DEVICE, METHOD OF CONTROLLING POSITIONING DEVICE, AND RECORDING MEDIUM HAVING PROGRAM FOR CONTROLLING POSITIONING DEVICE RECORDED THEREON

(75) Inventor: Hiroki Yoshioka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/755,786

(22) Filed: Apr. 7, 2010

(65) Prior Publication Data

US 2010/0194637 A1    Aug. 5, 2010

Related U.S. Application Data

(63) Continuation of application No. 11/826,677, filed on Jul. 17, 2007, now Pat. No. 7,898,474.

(30) Foreign Application Priority Data

Jul. 20, 2006  (JP) .................................. 2006-198755
Jul. 20, 2006  (JP) .................................. 2006-198756

(51) Int. Cl.
*G01S 19/28* (2010.01)
(52) U.S. Cl. ................................................. 342/357.67
(58) Field of Classification Search ... 342/357.2–357.78
See application file for complete search history.

(56) References Cited

U.S. PATENT DOCUMENTS

| 6,236,354 | B1 | 5/2001 | Krasner | |
|---|---|---|---|---|
| 6,313,786 | B1 | 11/2001 | Sheynblat et al. | |
| 6,707,422 | B2 | 3/2004 | Sheynblat et al. | |
| 2002/0050944 | A1 | 5/2002 | Sheynblat et al. | |
| 2004/0196183 | A1* | 10/2004 | Roh | 342/357.12 |
| 2005/0195107 | A1* | 9/2005 | Wakamatsu | 342/357.15 |
| 2005/0253755 | A1 | 11/2005 | Gobara | |
| 2006/0082495 | A1 | 4/2006 | Wakamatsu et al. | |

FOREIGN PATENT DOCUMENTS

| EP | 1 083 440 A2 | 3/2001 |
|---|---|---|
| EP | 1 635 185 A2 | 3/2006 |
| GB | 2 394 134 A | 4/2004 |
| JP | 2001-272450 A | 10/2001 |
| JP | 2003-514215 A | 4/2003 |
| JP | 2004-245657 A | 9/2004 |
| JP | 2005-326235 A | 11/2005 |
| JP | 2006-112878 A | 4/2006 |
| JP | 2006-126005 A | 5/2006 |

* cited by examiner

*Primary Examiner* — Thomas Tarcza
*Assistant Examiner* — Nga X Nguyen
(74) *Attorney, Agent, or Firm* — Global IP Counselors, LLP

(57) ABSTRACT

A positioning device 20 receives a satellite signal from a satellite positioning system (SPS) satellite and locates a present position, the positioning device 20 including an azimuth calculation section which calculates an azimuth of the SPS satellite corresponding to the received satellite signal, and a reception environment determination section which determines a reception environment including a multipath environment based on the azimuths of the SPS satellites calculated by the azimuth calculation section.

4 Claims, 22 Drawing Sheets

FIG. 7

SEARCH MODE M1 : OPERATION MODE OF SEARCHING FOR WIDE FREQUENCY RANGE

FIRST TRACKING MODE M2 : OPERATION MODE WHEN SIGNAL STRENGTH IS HIGH
(−139 dBm OR MORE)
ACCUMULATION TIME t1

SECOND TRACKING MODE M3 : OPERATION MODE WHEN SIGNAL STRENGTH IS LOW
(−160 dBm OR MORE AND LESS THAN −139 dBm)
ACCUMULATION TIME t2

| SATELLITE NUMBER | CODE PHASE | Pmax | Pnoise | XPR | ANGLE OF ELEVATION | AZIMUTH | MODE | FIELD INTENSITY |
|---|---|---|---|---|---|---|---|---|
| 1 | CP1 | Pmax1 | Pnoise1 | XPR1 | a1 | b1 | M2 | v1 |
| 2 | CP2 | Pmax2 | Pnoise2 | XPR2 | a2 | b2 | M2 | v2 |
| 3 | CP3 | Pmax3 | Pnoise3 | XPR3 | a3 | b3 | M2 | v3 |
| 4 | CP4 | Pmax4 | Pnoise4 | XPR4 | a4 | b4 | M2 | v4 |
| 5 | CP5 | Pmax5 | Pnoise5 | XPR5 | a5 | b5 | M3 | v5 |
| 6 | CP6 | Pmax6 | Pnoise6 | XPR6 | a6 | b6 | M3 | v6 |
| 7 | CP7 | Pmax7 | Pnoise7 | XPR7 | a7 | b7 | M3 | v7 |
| 8 | CP8 | Pmax8 | Pnoise8 | XPR8 | a8 | b8 | M3 | v8 |

FIG. 9

| STRONG ELECTRIC FIELD | FIRST STRONG ELECTRIC FIELD : $\alpha1$ OR MORE AND LESS THAN $\alpha2$<br>SECOND STRONG ELECTRIC FIELD : $\alpha2$ OR MORE AND LESS THAN $\alpha3$<br>THIRD STRONG ELECTRIC FIELD : $\alpha3$ OR MORE<br>$\alpha1 < \alpha2 < \alpha3$ |
|---|---|
| WEAK ELECTRIC FIELD | FIRST WEAK ELECTRIC FIELD : $\beta1$ OR MORE AND LESS THAN $\beta2$<br>SECOND WEAK ELECTRIC FIELD : $\beta2$ OR MORE AND LESS THAN $\beta3$<br>$\beta1 < \beta2 < \beta3$ |

FIG. 10

| ENVIRONMENT DETERMINATION PROGRAM 114 | POSITIONING PROGRAM 116 |
|---|---|
| FIRST ENVIRONMENT (OpenSky): NUMBER OF M2 SATELLITES WITH THIRD STRONG ELECTRIC FIELD IS EIGHT OR MORE (ALL) | LOCATES POSITION USING ALL MEASUREMENTS |
| SECOND ENVIRONMENT (SEMI-OpenSky): M2 SATELLITE WITH THIRD STRONG ELECTRIC FIELD, M2 SATELLITE WITH SECOND STRONG ELECTRICAL FIELD, AND M3 SATELLITE EXIST | LOCATES POSITION WHILE EXCLUDING MEASUREMENTS OF M3 SATELLITE |
| THIRD ENVIRONMENT (FIRST MULTIPATH ENVIRONMENT): M2 SATELLITES WITH FIRST STRONG ELECTRIC FIELD AND SECOND STRONG ELECTRIC FIELD AND M3 SATELLITE EXIST | LOCATES POSITION WHILE TAKING MULTIPATH MEASURES |
| FOURTH ENVIRONMENT (BIAS ENVIRONMENT): M2 SATELLITES WITH THIRD STRONG ELECTRIC FIELD AND M3 SATELLITES WITH SECOND WEAK ELECTRIC FIELD EXIST AND SATELLITE CONSTELLATION IS BIASED | LOCATES POSITION WHILE EXCLUDING MEASUREMENTS OF SATELLITE IN DIRECTION OPPOSITE TO BIAS DIRECTION |
| FIFTH ENVIRONMENT (VALLEY ENVIRONMENT): M2 SATELLITES WITH THIRD STRONG ELECTRIC FIELD AND M3 SATELLITES WITH SECOND WEAK ELECTRIC FIELD EXIST AND SATELLITE CONSTELLATION IS NOT BIASED | LOCATES POSITION WHILE EXCLUDING MEASUREMENTS IN OBSTACLE DIRECTION AND MEASUREMENTS OF M3 SATELLITE WITH SECOND WEAK ELECTRIC FIELD |
| SIXTH ENVIRONMENT (SECOND MULTIPATH ENVIRONMENT): NUMBER OF M3 SATELLITES IS LARGER THAN NUMBER OF M2 SATELLITES | LOCATES POSITION WHILE TAKING MULTIPATH MEASURES (WITHOUT EXCLUDING MEASUREMENTS OF M2 SATELLITE) |
| SEVENTH ENVIRONMENT (THIRD MULTIPATH ENVIRONMENT): NUMBER OF M2 SATELLITES IS ONLY ONE AND ALL OF REMAINING SATELLITES ARE M3 SATELLITES | LOCATES POSITION WHILE TAKING MULTIPATH MEASURES (CORRECTS MEASUREMENT ACCURACY) |
| EIGHTH ENVIRONMENT (SECOND WEAK ELECTRIC FIELD): ONLY M3 SATELLITES WITH SECOND WEAK ELECTRIC FIELD EXIST | LOCATES POSITION USING ALL MEASUREMENTS |
| NINTH ENVIRONMENT (FIRST WEAK ELECTRIC FIELD): ONLY M3 SATELLITES WITH FIRST WEAK ELECTRIC FIELD EXIST | LOCATES POSITION WHILE INCREASING ACCUMULATION TIME |

FIG. 11A
FIRST ENVIRONMENT (OpenSky)
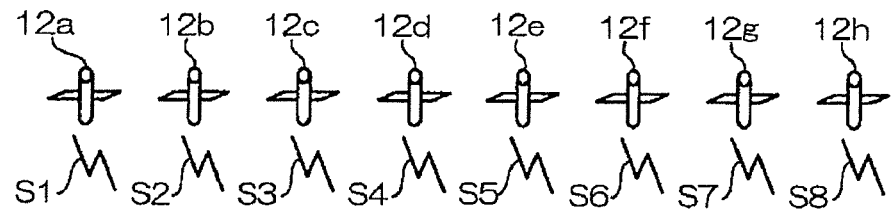
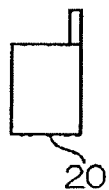
FIG. 11B
SECOND ENVIRONMENT (SEMI-OpenSky)
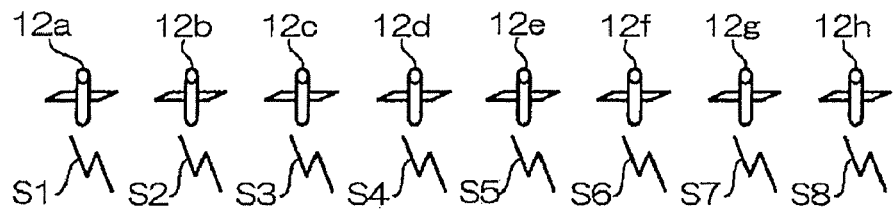
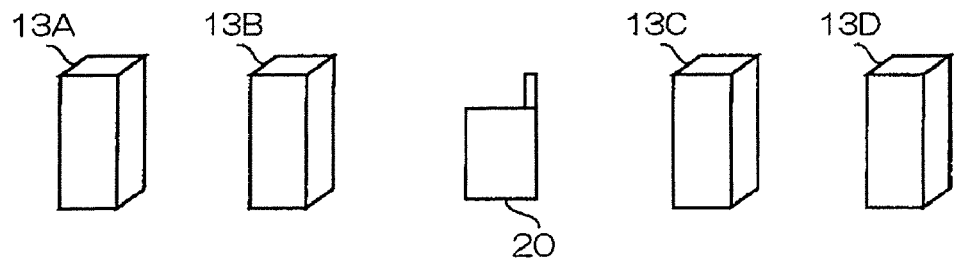

THIRD ENVIRONMENT (FIRST MULTIPATH ENVIRONMENT)

FOURTH ENVIRONMENT (BIAS ENVIRONMENT)

FIFTH ENVIRONMENT (VALLEY ENVIRONMENT)

FIG. 14
SIXTH ENVIRONMENT (SECOND MULTIPATH ENVIRONMENT)
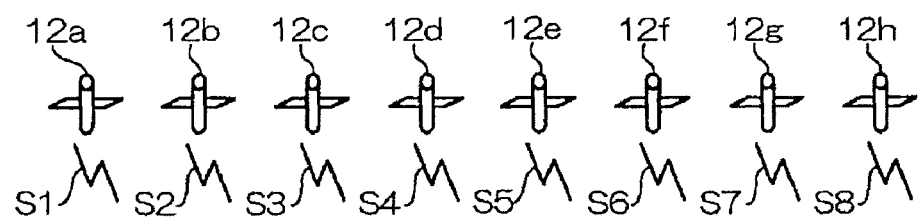
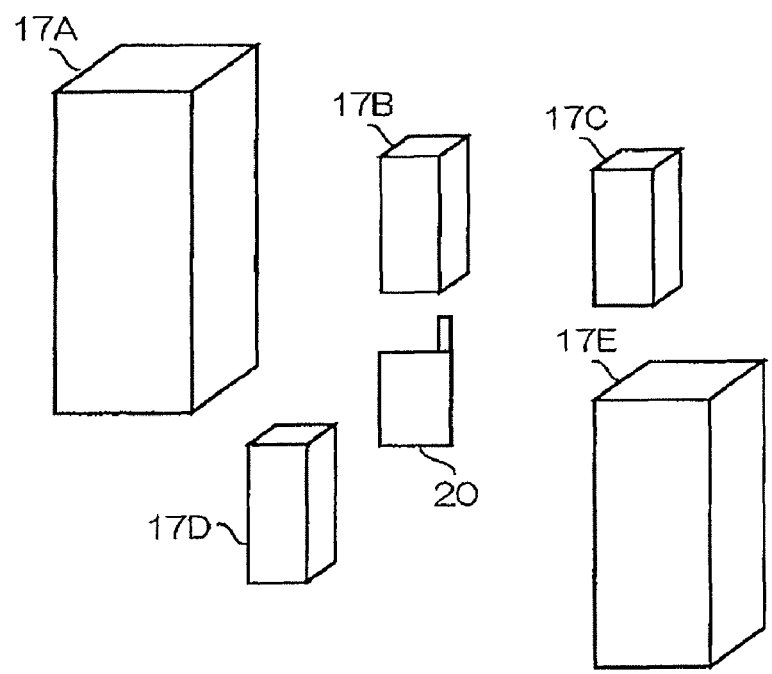

FIG. 15A
SEVENTH ENVIRONMENT (THIRD MULTIPATH ENVIRONMENT)
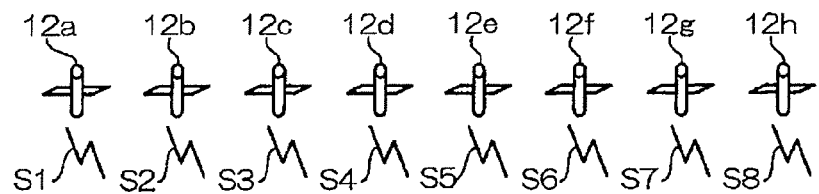
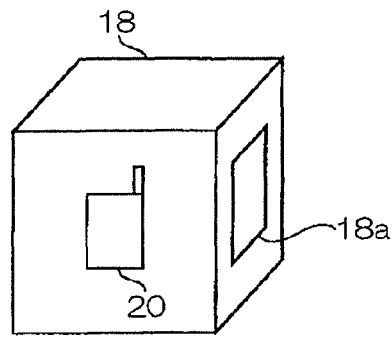
FIG. 15B
EIGHTH ENVIRONMENT (SECOND WEAK ELECTRIC FIELD)
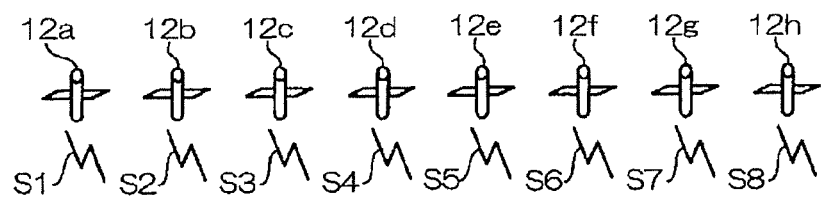
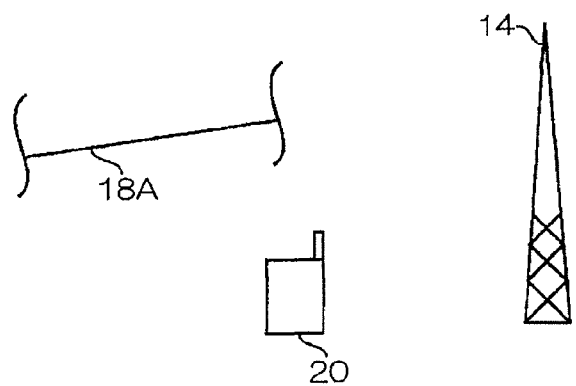

NINTH ENVIRONMENT (FIRST WEAK ELECTRIC FIELD)

⊚ SATELLITE WITH STRONG ELECTRIC FIELD

● SATELLITE WITH FIRST WEAK ELECTRIC FIELD

POSITIONING DEVICE, METHOD OF CONTROLLING POSITIONING DEVICE, AND RECORDING MEDIUM HAVING PROGRAM FOR CONTROLLING POSITIONING DEVICE RECORDED THEREON

This is a divisional application of U.S. patent application Ser. No. 11/826,677 which claims priority to Japanese Patent Application Nos. 2006-198755 and 2006-198756 both of which were filed on Jul. 20, 2006. The entire disclosure of U.S. patent application Ser. No. 11/826,677, and Japanese Patent Application Nos. 2006-198755 and 2006-198756 is hereby incorporated herein by reference.

BACKGROUND OF THE INVENTION

The present invention relates to a positioning device which utilizes a radio wave from a transmission source, a method of controlling a positioning device, and a recording medium having a program for controlling a positioning device recorded thereon.

A positioning system has been used in practice which locates the present position of a GPS receiver utilizing a satellite navigation system such as a global positioning system (GPS).

The GPS receiver receives a clear and acquisition or coarse and access (C/A) code which is one type of pseudo-random noise code (hereinafter called "PN code") carried on a radio wave from a GPS satellite (hereinafter called "satellite radio wave") based on a navigation message indicating the orbit of the GPS satellite and the like (including almanac (approximate satellite orbital information), ephemeris (precise satellite orbital information), and the like). The C/A code is a code which forms the basis for positioning.

The GPS receiver specifies the GPS satellite which has transmitted the C/A code, and calculates the distance (pseudo-range) between the GPS satellite and the GPS receiver based on the phase of the C/A code (code phase), for example. The GPS receiver locates the position of the GPS receiver based on the pseudo-range between the GPS receiver and each of three or more GPS satellites and the position of each GPS satellite in the satellite orbit. For example, the C/A code has a bit rate of 1.023 Mbps and a code length of 1023 chips. Therefore, it is considered that the C/A codes line up in units of about 300 kilometers (km) over which a radio wave advances in 1 millisecond (ms). Therefore, the pseudo-range can be calculated by calculating the number of C/A codes between the GPS satellite and the GPS receiver from the position of the GPS satellite in the satellite orbit and the approximate position of the GPS receiver. In more detail, the pseudo-range can be calculated by calculating one cycle (1023 chips) of the C/A code (integer portion of the C/A code), and specifying the phase of the C/A code (fraction portion of the C/A code). The integer portion of the C/A code can be estimated when the approximate position of the GPS receiver has a specific accuracy (e.g. 150 km or less). Therefore, the GPS receiver can calculate the pseudo-range by specifying the phase of the C/A code.

The GPS receiver correlates the received C/A code with a C/A code replica generated in the GPS receiver, accumulates the correlation values, and specifies the phase of the C/A code when the correlation cumulative value has reached a specific level. The GPS receiver performs the correlation process while changing the phase of the C/A code replica and the frequency.

However, when the satellite radio wave received from the GPS satellite is an indirect wave which reaches the GPS receiver after being reflected by a building or the like (hereinafter called "indirect wave"), the GPS receiver cannot accurately specify the phase of the C/A code.

In order to deal with this problem, technology has been proposed in which a GPS receiver with a communication function stores map data with multipath frequency region information, and determines whether or not the present position acquired by positioning is included in the multipath frequency region. When a base station with which the GPS receiver communicates is located in an urban area, the GPS receiver determines whether or not the base station is located in the multipath frequency region (e.g. JP-A-2001-272450).

However, the above technology has a first problem in which it is necessary for the GPS receiver to store the map data or communicate with the base station. As a second problem, since a poor reception state also occurs in an environment other than the multipath environment and the multipath environment varies, the position may not be determined while effectively using satellite signals corresponding to various reception environments when merely determining the multipath environment.

SUMMARY

According to one aspect of the invention, there is provided a positioning device which receives a satellite signal from a satellite positioning system (SPS) satellite and locates a present position, the positioning device comprising:

an azimuth calculation section which calculates an azimuth of the SPS satellite corresponding to the received satellite signal; and a reception environment determination section which determines a reception environment including a multipath environment based on the azimuths of the SPS satellites calculated by the azimuth calculation section.

According to another aspect of the invention, there is provided a positioning device which receives a satellite signal from a satellite positioning system (SPS) satellite and locates a present position, the positioning device comprising:

a positioning base value calculation section which calculates positioning base values including a phase and signal strength of the satellite signal based on the satellite signal;

a reception environment determination section which determines a reception environment of the satellite signal based on a reception state of the satellite signals from the SPS satellites; and a positioning section which locates a position using the positioning base values based on the reception environment determined by the reception environment determination section.

BRIEF DESCRIPTION OF THE SEVERAL VIEWS OF THE DRAWING

FIG. 7 is a view illustrative of a process based on a satellite signal reception program.

FIG. 8 is a view showing an example of measurement information.

FIG. 9 is a view illustrative of a process based on an environment determination program.

FIG. 10 is a view illustrative of a process based on the environment determination program and a positioning program.

FIGS. 11A and 11B are views illustrative of a reception environment.

FIG. 14 is a view illustrative of a reception environment.

FIGS. 15A and 15B are views illustrative of a reception environment.

DETAILED DESCRIPTION OF THE EMBODIMENT

Figure 1:
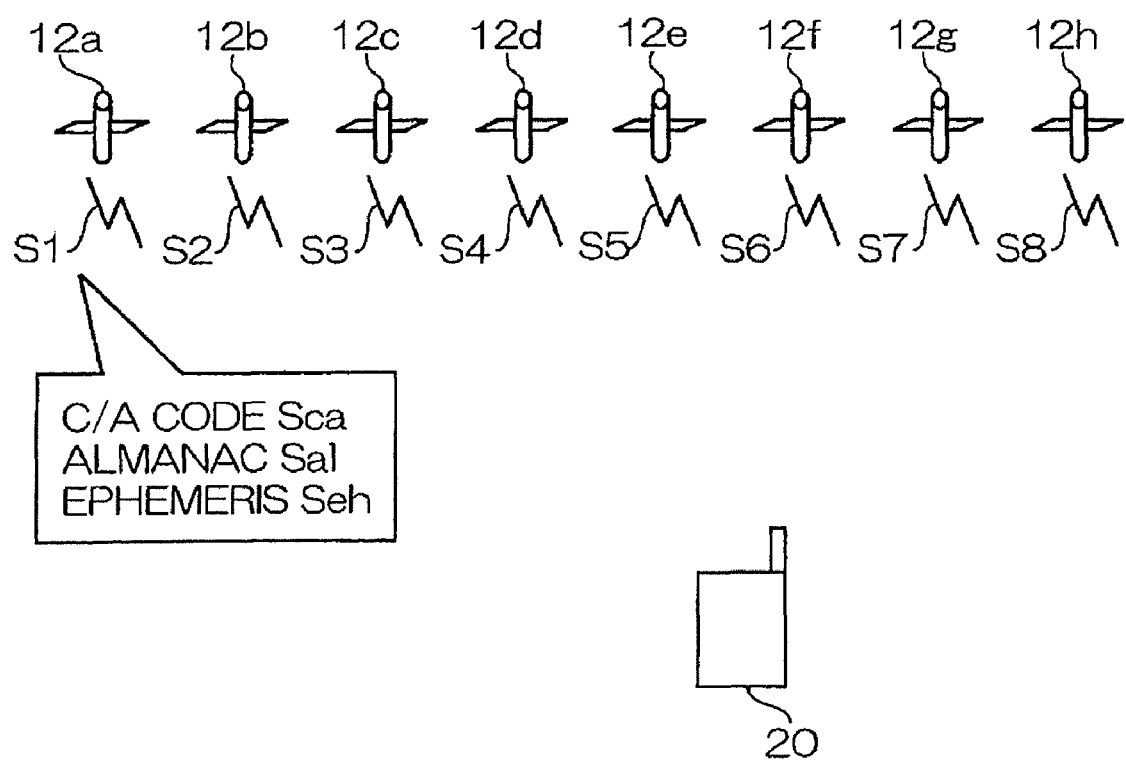
FIG. 1 is a schematic view showing a terminal and the like according to one embodiment of the invention.

The invention may achieve positioning while promptly excluding a multipath signal without storing map data or communicating with a base station. The invention may also achieve positioning effectively using satellite signals corresponding to various reception environments.

According to one embodiment of the invention, there is provided a positioning device which receives a satellite signal from a satellite positioning system (SPS) satellite and locates a present position, the positioning device comprising:

an azimuth calculation section which calculates an azimuth of the SPS satellite corresponding to the received satellite signal; and a reception environment determination section which determines a reception environment including a multipath environment based on the azimuths of the SPS satellites calculated by the azimuth calculation section.

According to this configuration, since the positioning device includes the reception environment determination section, the positioning device can determine the reception environment including the multipath environment without storing map data or communicating with a base station.

In the positioning device according to this embodiment, the positioning device may have a plurality of positioning modes which differ in operating signal strength; and the reception environment determination section may determine whether or not the SPS satellites are biased based on the number of the SPS satellites corresponding to the satellite signals received in each of the positioning modes.

According to this configuration, the positioning device can determine the reception environment based on the number of SPS satellites corresponding to the satellite signals received in each positioning mode.

In the positioning device according to this embodiment, the reception environment determination section may determine whether or not the SPS satellites are biased based on the azimuth of a strong signal satellite which is the SPS satellite corresponding to the satellite signal within a predetermined signal strength range.

According to this configuration, since the positioning device determines the reception environment using the azimuth of the SPS satellite with a relatively strong signal strength, the positioning device can accurately determine the reception environment.

In the positioning device according to this embodiment, the reception environment determination section may determine that the SPS satellites are biased toward an angle of the center region when a first bias condition is satisfied whereby the number of the strong signal satellites located in a center region is almost equal to the number of the strong signal satellites located in adjacent regions adjacent to the center region in Miming angular regions by equally dividing an angular range of 360 degrees into at least eight regions.

In the positioning device according to this embodiment, the reception environment determination section may calculate a center of gravity of a figure formed by connecting coordinates of each of the SPS satellites specified by an angle of elevation and the azimuth, may calculate a vector from the positioning device toward the center of gravity, and may determine that the SPS satellites are biased in the direction of the vector when a second bias condition is satisfied whereby magnitude of the vector is equal to or less than predetermined magnitude.

In the positioning device according to this embodiment, the positioning modes may include a first positioning mode used under a strong electric field, and a second positioning mode used when a field intensity is weaker than that of the strong electric field;

the weak electric field may be classified into a first weak electric field and a second weak electric field specified by a field intensity higher than that of the first weak electric field; and the reception environment determination section may determine whether or not the first bias condition or the second bias condition is satisfied when the number of the SPS satellites corresponding to the satellite signals received in the first positioning mode is almost equal to the number of the SPS satellites corresponding to the satellite signals received in the second positioning mode and having the second weak electric field.

In the positioning device according to this embodiment, the reception environment determination section may determine that the reception environment is a valley when the number of the SPS satellites corresponding to the satellite signals received in the first positioning mode is almost equal to the number of the SPS satellites corresponding to the satellite signals received in the second positioning mode and having the second weak electric field and the first bias condition or the second bias condition is not satisfied.

In the positioning device according to this embodiment, the positioning device may locate the position while excluding the SPS satellite in a direction opposite to a direction in which the SPS satellites are biased.

In the positioning device according to this embodiment, when the reception environment is a valley, the positioning device may locate the position while excluding the SPS satellite in a predetermined low-angle-of-elevation range.

According to another embodiment of the invention, there is provided a positioning device which receives a satellite signal from a satellite positioning system (SPS) satellite and locates a present position, the positioning device comprising:

a positioning base value calculation section which calculates positioning base values including a phase and signal strength of the satellite signal based on the satellite signal;

a reception environment determination section which determines a reception environment of the satellite signal based on a reception state of the satellite signals from the SPS satellites; and a positioning section which locates a position using the positioning base values based on the reception environment determined by the reception environment determination section.

According to this configuration, since the positioning device includes the reception environment determination section, the positioning device can determine the reception environment without storing map data or communicating with a base station.

Since the positioning device includes the positioning section, the positioning device can locate the position using the positioning base values based on various reception environments.

This allows the positioning device to locate the position without storing map data or communicating with a base station while effectively using the satellite signals corresponding to various reception environments.

In the positioning device according to this embodiment, the positioning device may have a plurality of positioning modes which differ in operating signal strength; and the reception environment determination section may determine the reception environment based on the number of the SPS satellites corresponding to the satellite signals received in each of the positioning modes.

According to this configuration, the positioning device can determine the reception environment based on the number of SPS satellites corresponding to the satellite signals received in each positioning mode. Specifically, since each positioning mode differs in operating signal strength, the signal strength of each satellite signal can be indirectly determined based on the number of SPS satellites corresponding to the satellite signals received in each positioning mode. This enables the positioning device to determine the reception environment.

In the positioning device according to this embodiment, the positioning section may determine whether or not to exclude the positioning base values or correct the positioning base values based on the reception environment determined by the reception environment determination section.

According to this configuration, since the positioning device can also determine whether or not to exclude the positioning base values or correct the positioning base values, the positioning device can locate the position effectively using the satellite signals corresponding to various reception environments.

In the positioning device according to this embodiment, the positioning modes may include a first positioning mode used under a strong electric field, and a second positioning mode used when a field intensity is weaker than that of the strong electric field.

In the positioning device according to this embodiment, the strong electric field may be classified into a first strong electric field, a second strong electric field specified by a field intensity higher than that of the first strong electric field, and a third strong electric field specified by a field intensity higher than that of the second strong electric field;

the weak electric field may be classified into a first weak electric field and a second weak electric field specified by a field intensity higher than that of the first weak electric field; and the reception environment determination section may determine that the reception environment is an OpenSky environment when the number of the SPS satellites corresponding to the satellite signals received in the first positioning mode and having the third strong electric field is equal to or larger than a predetermined number.

In the positioning device according to this embodiment, the reception environment determination section may determine that the reception environment is a semi-OpenSky environment when the SPS satellite corresponding to the satellite signal received in the first positioning mode and having the third strong electric field, the SPS satellite corresponding to the satellite signal received in the first positioning mode and having the second strong electric field, and the SPS satellite corresponding to the satellite signal received in the second positioning mode exist in combination.

In the positioning device according to this embodiment, the reception environment determination section may determine that the reception environment is a first multipath environment when the SPS satellite corresponding to the satellite signal received in the first positioning mode and having the first strong electric field, the SPS satellite corresponding to the satellite signal received in the first positioning mode and having the second strong electric field, and the SPS satellite corresponding to the satellite signal received in the second positioning mode exist in combination.

In the positioning device according to this embodiment, the reception environment determination section may determine that the reception environment is a bias environment when the SPS satellite corresponding to the satellite signal received in the first positioning mode and having the third strong electric field and the SPS satellite corresponding to the satellite signal received in the second positioning mode and having the second weak electric field exist in combination and constellation of the SPS satellites is biased.

In the positioning device according to this embodiment, the reception environment determination section may determine that the reception environment is a valley environment when the SPS satellite corresponding to the satellite signal received in the first positioning mode and having the third strong electric field and the SPS satellite corresponding to the satellite signal received in the second positioning mode and having the second weak electric field exist in combination and constellation of the SPS satellites is not biased.

In the positioning device according to this embodiment, the reception environment determination section may determine that the reception environment is a second multipath environment when the number of the SPS satellites corresponding to the satellite signals received in the second positioning mode is larger than the number of the SPS satellites corresponding to the satellite signals received in the first positioning mode.

In the positioning device according to this embodiment, the reception environment determination section may determine that the reception environment is a third multipath environment when the number of the SPS satellites corresponding to the satellite signals received in the first positioning mode is one.

In the positioning device according to this embodiment, the reception environment determination section may determine that the reception environment is the first weak electric field when only the SPS satellites corresponding to the satellite signals received in the second positioning mode and having the second weak electric field exist.

In the positioning device according to this embodiment, the reception environment determination section may determine that the reception environment is the second weak electric field when only the SPS satellites corresponding to the satellite signals received in the second positioning mode and having the first weak electric field exist.

According to a further embodiment of the invention, there is provided a method of controlling a positioning device which receives a satellite signal from a satellite positioning system (SPS) satellite and locates a present position, the method comprising:

an azimuth calculation step of calculating an azimuth of the SPS satellite corresponding to the received satellite signal; and a reception environment determination step of determining a reception environment including a multipath environment based on the calculated azimuths of the SPS satellites.

According to a further embodiment of the invention, there is provided a method of controlling a positioning device which receives a satellite signal from a satellite positioning system (SPS) satellite and locates a present position, the method comprising:

a positioning base value calculation step of calculating positioning base values including a phase and signal strength of the satellite signal based on the satellite signal;

a reception environment determination step of determining a reception environment of the satellite signal; and a positioning step of locating a position using the positioning base values based on the determined reception environment.

According to a further embodiment of the invention, there is provided a computer-readable recording medium having recorded thereon a program for causing a computer included in a positioning device, which receives a satellite signal from an SPS satellite and locates a present position, to execute the above method.

Preferred embodiments of the invention are described below in detail with reference to the drawings.

The following embodiments illustrate specific preferred embodiments of the invention and are provided with various technologically preferred limitations. Note that the scope of the invention is not limited to the following embodiments unless there is a description limiting the invention.

FIG. 1 is a schematic view showing a terminal 20 and the like according to one embodiment of the invention.

As shown in FIG. 1, the terminal 20 can receive radio waves S1, S2, S3, S4, S5, S6, S7, and S8 from GPS satellites (SPS satellites) 12a, 12b, 12c, 12d, 12e, 12f, 12g, and 12h, for example. Note that the SPS satellite is not limited to the GPS satellite.

Various codes are carried on the radio waves S1 and the like. A C/A code Sca is one of such codes. The C/A code Sca is a signal having a bit rate of 1.023 Mbps and a bit length of 1023 bits (=1 msec). The C/A code Sca includes 1023 chips. The terminal 20 exemplifies a positioning device which locates the present position. The terminal 20 receives the C/A code and locates the present position. The C/A code Sca exemplifies a satellite signal.

As information carried on the radio waves S1 and the like, an almanac Sal and an ephemeris Seh can be given. The almanac Sal is information indicating the approximate satellite orbits of all of the GPS satellites 12a and the like, and the ephemeris Seh is information indicating the precise satellite orbit of each of the GPS satellites 12a and the like. The almanac Sal and the ephemeris Seh are generically called a navigation message.

The terminal 20 can locate the present position by specifying the phases of the C/A codes from three or more GPS satellites 12a and the like, for example.

Figure 2:
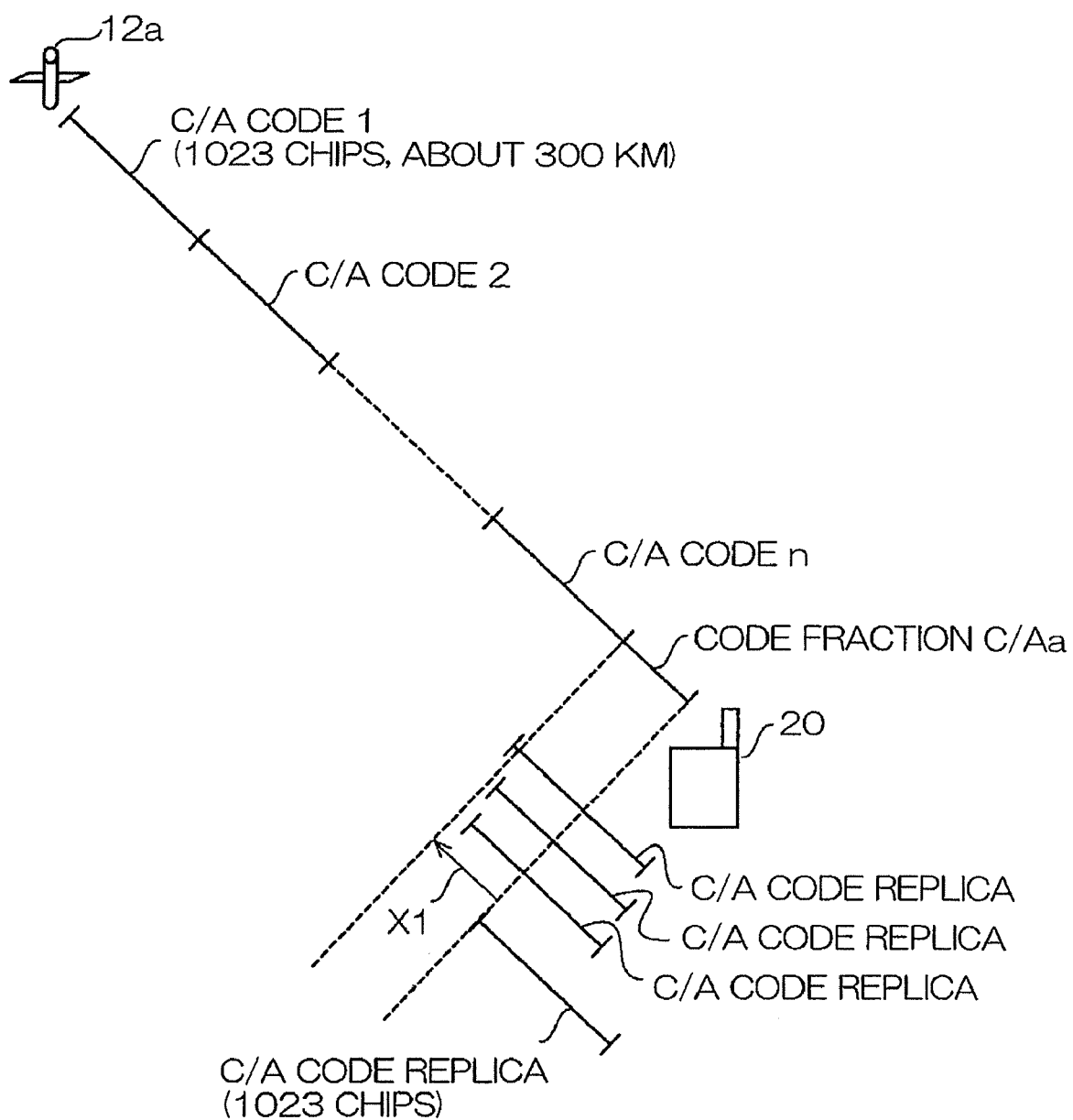
FIG. 2 is a schematic view showing a positioning method.

FIG. 2 is a schematic view showing an example of a positioning method.

As shown in FIG. 2, it may be considered that the C/A codes continuously line up between the GPS satellite 12a and the terminal 20, for example. Since the distance between the GPS satellite 12a and the terminal 20 is not necessarily a multiple of the length (300 kilometers (km)) of the C/A code, a code fraction C/Aa may exist. Specifically, a portion of a multiple of the C/A code and a fraction portion may exist between the GPS satellite 12a and the terminal 20. The total length of the portion of a multiple of the C/A code and the fraction portion is the pseudo-range. The terminal 20 locates the position using the pseudo-ranges for three or more GPS satellites 12a and the like.

In this specification, the fraction portion C/Aa of the C/A code is called a code phase. The code phase may be indicated by the number of the chip included in the 1023 chips of the C/A code, or may be converted into distance, for example. When calculating the pseudo-range, the code phase is converted into distance.

The position of the GPS satellite 12a in the orbit can be calculated using the ephemeris Seh. The portion of a multiple of the C/A code can be specified by calculating the distance between the position of the GPS satellite 12a in the orbit and an initial position P0 described later, for example. Since the length of the C/A code is 300 kilometers (km), the position error of the initial position P0 must be 150 kilometers (km) or less.

As shown in FIG. 2, a correlation process is performed while moving the phase of a C/A code replica in the direction indicated by an arrow X1, for example. The terminal 20 performs the correlation process while changing the synchronization frequency. The correlation process includes a coherent process and an incoherent process described later.

The phase having the maximum correlation cumulative value is the code fraction C/Aa.

Figure 3:
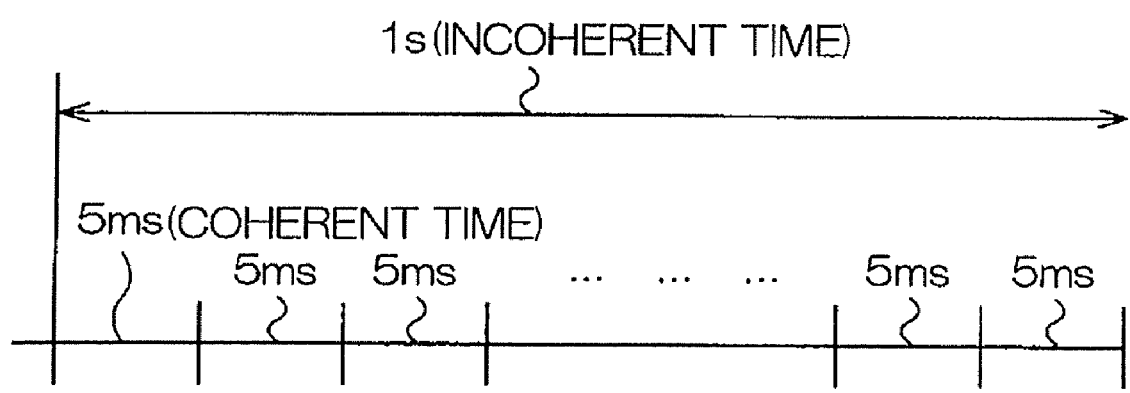
FIG. 3 is a view illustrative of a correlation process.

FIG. 3 is a view illustrative of the correlation process.

The coherent process is a process of correlating the C/A code received by the terminal 20 with the C/A code replica. The C/A code replica is a code generated by the terminal 20.

For example, when the coherent time is 5 milliseconds (msec), as shown in FIG. 3, the correlation value between the C/A code synchronously accumulated over 5 milliseconds (msec) and the C/A code replica is calculated. The correlated phase (code phase) and the correlation value are output as a result of the coherent process.

The incoherent process is a process of calculating the correlation cumulative value (incoherent value) by accumulating the correlation values as the coherent results.

The code phase output by the coherent process and the correlation cumulative value are output as a result of the correlation process.

Figure 4:
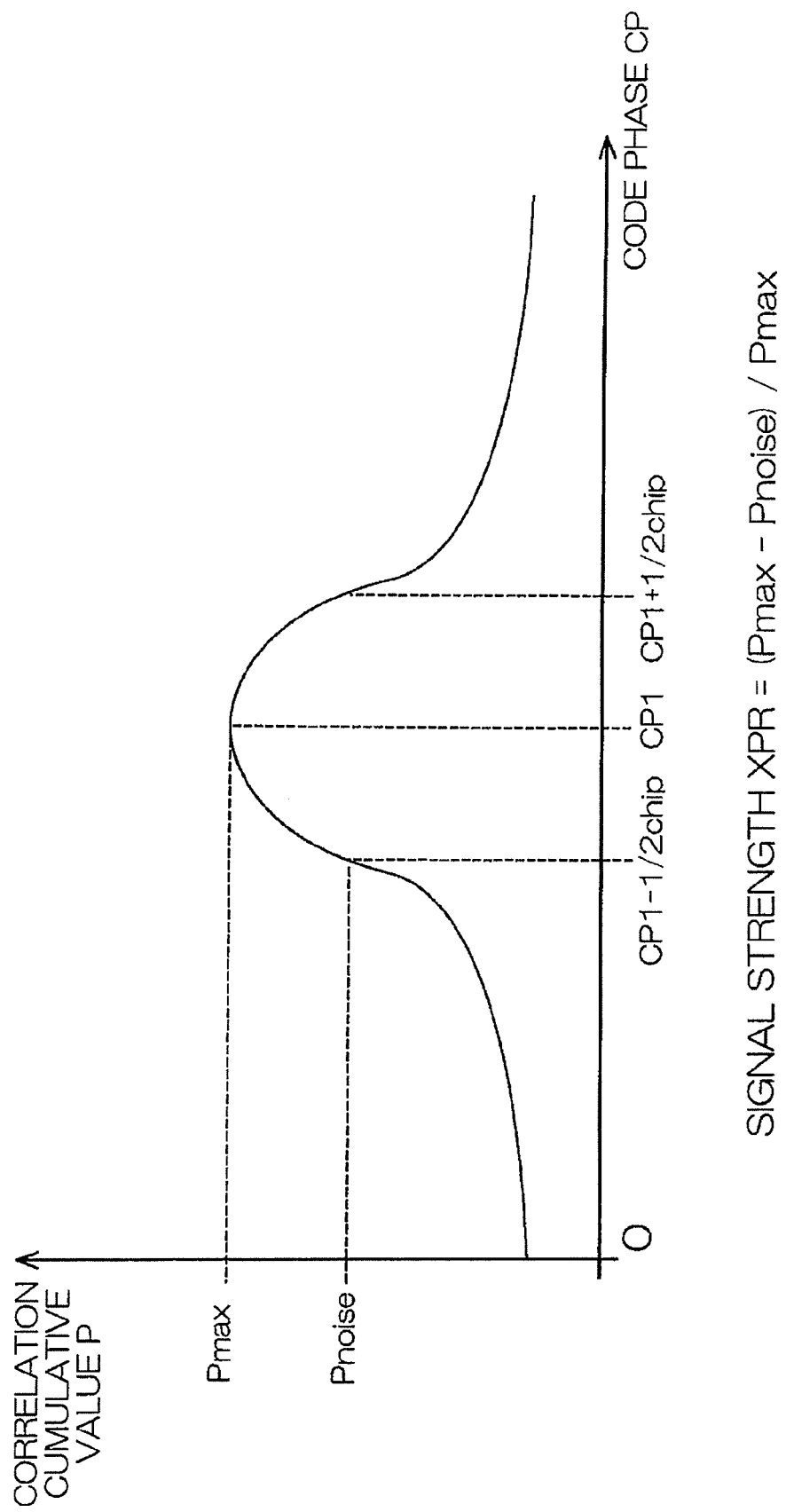
FIG. 4 is a view showing an example of the relationship between a correlation cumulative value and a code phase.

FIG. 4 is a view showing an example of the relationship between the correlation cumulative value and the code phase.

A code phase CP1 corresponding to the maximum correlation cumulative value Pmax shown in FIG. 4 is the code phase of the C/A code replica (i.e. the code phase of the C/A code).

The terminal 20 sets the correlation cumulative value of the code phase positioned at an interval of half of the chip from the code phase CP1 and having a smaller correlation cumulative value to be a correlation cumulative value Pnoise of noise, for example.

The terminal 20 specifies a value obtained by dividing the difference between the correlation cumulative values Pmax and Pnoise by the correlation cumulative value Pmax as a signal strength XPR.

Note that the maximum correlation cumulative value Pmax and the signal strength XPR calculated when inputting a signal with a specific field intensity can be obtained by experiment. Therefore, the terminal 20 can calculate the field intensity of the radio waves S1 and the like received by the terminal 20 from the maximum correlation cumulative value Pmax and the signal strength XPR.

The term "field intensity" used herein refers to the field intensity of the radio waves S1 and the like reaching an antenna (not shown) of the terminal 20.

When the field intensity is high, the code phase can be specified, even if the incoherent time is short. The specified code phase has a high accuracy.

On the other hand, when the field intensity is low, the code phase cannot be specified if the incoherent time is not increased. The specified code phase has an accuracy lower than that specified when the field intensity is high.

(Main Hardware Configuration of Terminal 20)

Figure 5:
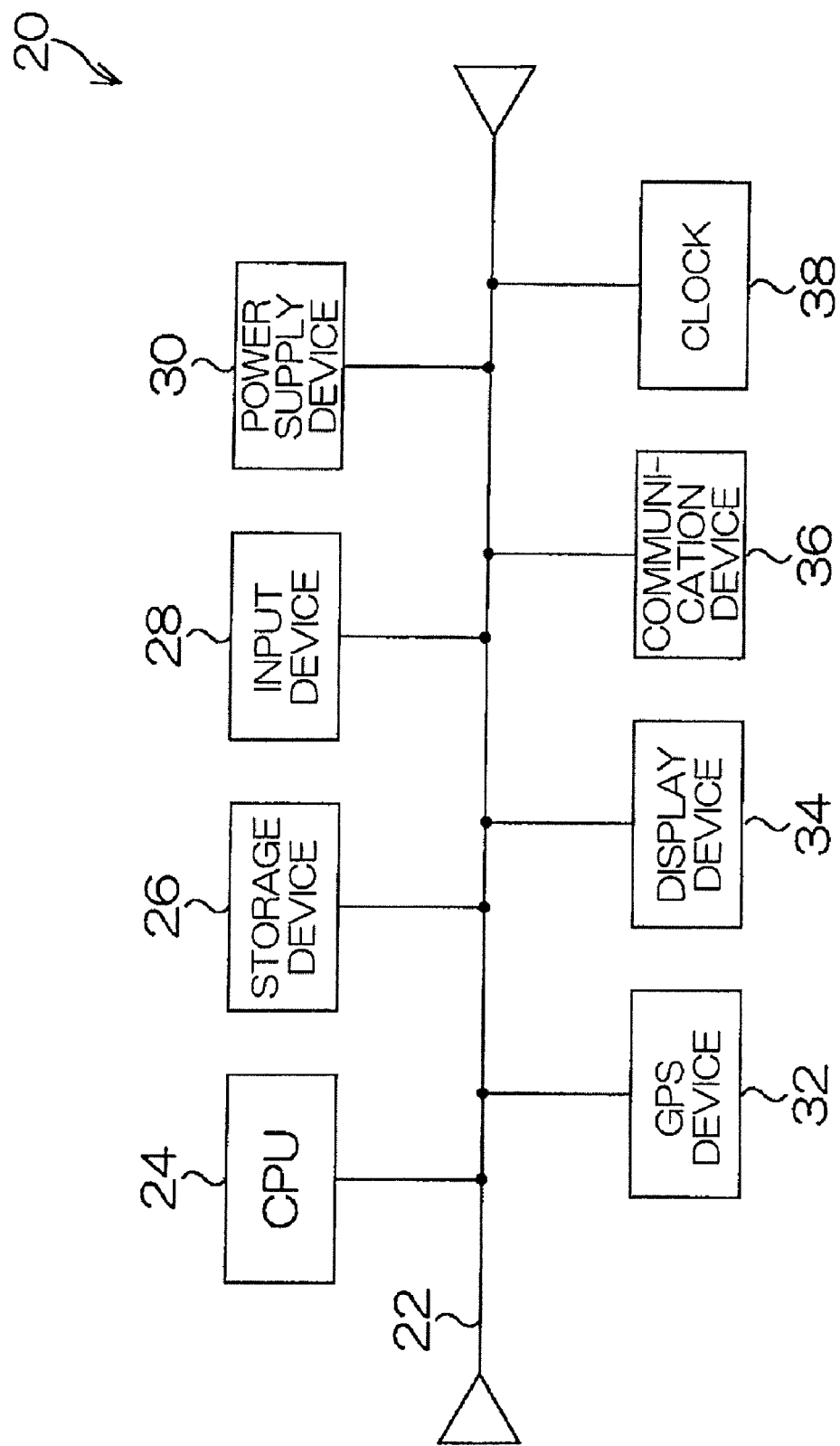
FIG. 5 is a schematic view showing the main hardware configuration of the terminal.

FIG. 5 is a schematic view showing the main hardware configuration of the terminal 20.

As shown in FIG. 5, the terminal 20 includes a computer which includes a bus 22. A central processing unit (CPU) 24, a storage device 26, and the like are connected with the bus 22. The storage device 26 is a random access memory (RAM), a read only memory (ROM), or the like.

An input device 28, a power supply device 30, a GPS device 32, a display device 34, a communication device 36, and a clock 38 are also connected with the bus 22.

(Main Software Configuration of Terminal 20)

Figure 6:
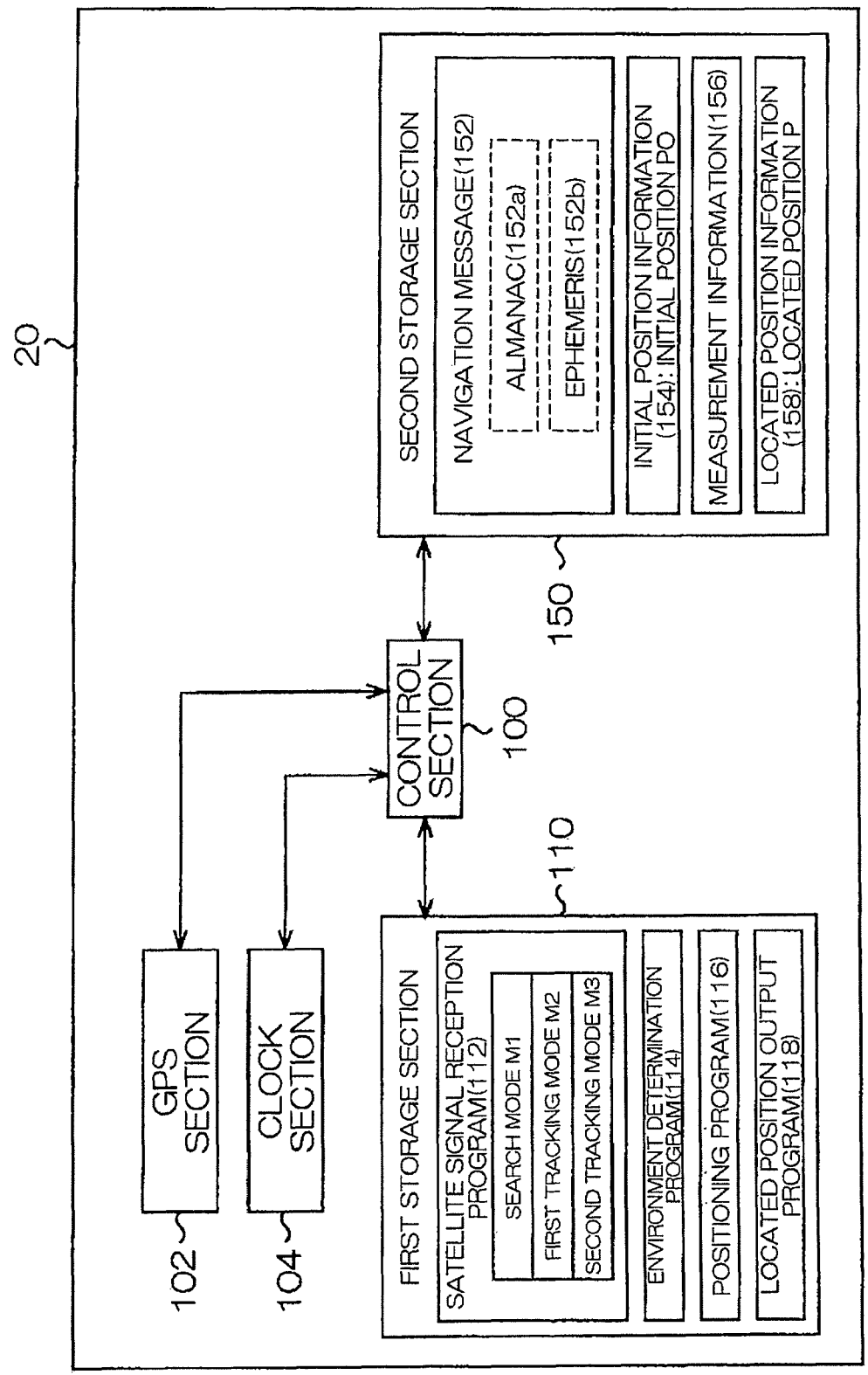
FIG. 6 is a schematic view showing the main software configuration of the terminal.

FIG. 6 is a schematic view showing the main software configuration of the terminal 20.

As shown in FIG. 6, the terminal 20 includes a control section 100 which controls each section, a GPS section 102 corresponding to the GPS device 32 shown in FIG. 5, a clock section 104 corresponding to the clock 38, and the like.

The terminal 20 also includes a first storage section 110 which stores various programs, and the second storage section 150 which stores various types of information.

As shown in FIG. 6, the terminal 20 stores a navigation message 152 in the second storage section 150. The navigation message 152 includes an almanac 152a and an ephemeris 152b.

The terminal 20 uses the almanac 152a and the ephemeris 152b for positioning.

As shown in FIG. 6, the terminal 20 stores initial position information 154 in the second storage section 150. The initial position P0 is the preceding located position, for example.

As shown in FIG. 6, the terminal 20 stores a satellite signal reception program 112 in the first storage section 110. The satellite signal reception program 112 is a program for causing the control section 100 to receive the radio waves S1 and the like. The control section 100 determines the GPS satellites 12a and the like which can be observed at the present time referring to the almanac 152a. The control section 100 calculates the present position of each of the GPS satellites 12a and the like in the orbit referring to the ephemeris 152b, and calculates the Doppler shift of the radio waves S1 and the like to estimate the reception frequency. The control section 100 receives the signals S1 and the like from the GPS satellites 12a and the like using the estimated reception frequency. In this case, the initial position P0 is used as the reference position of the terminal 20, for example.

FIG. 7 is a view illustrative of the process based on the satellite signal reception program 112.

As shown in FIG. 7, the satellite signal reception program 112 includes a program for executing a search mode M1, a first tracking mode M2, and a second tracking mode M3.

The search mode M1 is a mode for acquiring the radio waves S1 and the like. Therefore, the terminal 20 searches for a wide frequency range of 3 kHz in the search mode M1, for example.

The first tracking mode M2 (hereinafter called "mode M2") is a positioning mode in which the terminal 20 tracks the acquired radio waves S1 and the like. The mode M2 is an operation mode (positioning mode) when the signal strength (field intensity) is high. The term "high signal strength" refers to a signal strength of −139 dBm or more, for example.

An accumulation time (incoherent time) t1 in the mode M2 is one second, for example.

The second tracking mode M3 (hereinafter called "mode M3") is a positioning mode in which the terminal 20 tracks the acquired radio waves S1 and the like. The mode M3 is an operation mode (positioning mode) when the signal strength is low. The term "low signal strength" refers to a signal strength of −160 dBm or more and less than −139 dBm, for example.

An accumulation time (incoherent time) t2 in the mode M3 is two seconds, for example.

The accumulation time t2 in the mode M3 is set to be longer than the accumulation time t1 in the mode M2.

The terminal 20 has a plurality of positioning modes which differ in operating signal strength, as described above. The modes M2 and M3 exemplify a positioning mode. The mode M2 also exemplifies a first positioning mode. The mode M3 also exemplifies a second positioning mode.

The control section 100 calculates measurements including the code phase of the received C/A code, the signal strength, the angle of elevation, and the azimuth based on the satellite signal reception program 112.

The measurement calculation program 114 and the control section 100 exemplify an azimuth calculation section.

The measurement exemplifies a positioning base value. Therefore, the measurement calculation program 114 and the control section 100 also exemplify a positioning base value calculation section. The control section 100 calculates the measurements while tracking the radio waves in the mode M2 or M3.

The control section 100 stores measurement information 156 indicating the measurements in the second storage section 150.

FIG. 8 is a view showing an example of the measurement information 156.

As shown in FIG. 8, the measurement information 156 includes satellite numbers 1 to 8. In this embodiment, the terminal 20 receives the radio waves S1 to S8 from the GPS satellites 12a to 12h.

The satellite number 1 to 8 respectively correspond to the GPS satellites 12a to 12h.

The measurement information 156 also includes the code phase. The code phase differs depending on the GPS satellites 12a and the like.

The measurement information 156 also includes the maximum correlation cumulative value Pmax, the correlation cumulative value Pnoise, and the signal strength XPR.

The measurement information 156 also includes the angle of elevation and the azimuth. The angle of elevation and the azimuth indicate the position of each of the GPS satellites 12a and the like by the angle of elevation and the azimuth based on the initial position P0. The control section 100 calculates the present position of each of the GPS satellites 12a and the like in the orbit based on the ephemeris 152b, and calculates the angle of elevation and the azimuth of each of the GPS satellites 12a and the like based on the initial position P0.

The measurement information 156 also includes the modes M2 and M3.

For example, when the terminal 20 has received the radio wave S1 from the GPS satellite 12a in the mode M2, the mode M2 corresponds to the satellite number 1. When the terminal 20 has received the radio wave S5 from the GPS satellite 12e in the mode M3, the mode M3 corresponds to the satellite number 5.

Therefore, when the terminal 20 has received the radio wave S1 from the GPS satellite 12a in the mode M2, the GPS satellite 12a is also called a "M2 satellite", for example.

The measurement information 156 also includes the field intensity. The control section 100 calculates the field intensity from the maximum correlation cumulative value Pmax or the signal strength XPR. The field intensity differs depending on the GPS satellites 12a and the like.

For example, v1 is −159 dBm, and v2 is −140 dBm.

The code phase, the maximum correlation cumulative value Pmax, the correlation cumulative value Pnoise, the signal strength XPR, the angle of elevation, and the azimuth included in the measurement information 156 are called measurements.

As shown in FIG. 6, the terminal 20 stores an environment determination program 114 in the first storage section 110. The environment determination program 114 is a program for causing the control section 100 to determine the reception environment of the C/A code based on the reception state of the C/A codes from the GPS satellites 12a and the like. The environment determination program 114 and the control section 100 exemplify a reception environment determination section. The reception environment includes a multipath environment in which a multipath easily occurs.

As shown in FIG. 6, the terminal 20 stores a positioning program 116 in the first storage section 110. The positioning program 116 is a program for causing the control section 100 to locate the position using the measurements based on the reception environment. The positioning program 116 and the control section 100 exemplify a positioning section.

FIG. 9 is a view illustrative of the process based on the environment determination program 114.

FIG. 10 is a view illustrative of the process based on the environment determination program 114 and the positioning program 116.

As shown in FIG. 9, the control section 100 classifies the field intensities v1 and the like (see FIG. 8) as a strong electric field or a weak electric field based on the environment determination program 114. The strong electric field is a field intensity in which the terminal 20 operates in the mode M2. The weak electric field is a field intensity in which the terminal 20 operates in the mode M3.

The control section 100 classifies the strong electric field into a first strong electric field, a second strong electric field, and a third strong electric field.

The first strong electric field is a field intensity of $\alpha 1$ or more and less than $\alpha 2$. The second strong electric field is a field intensity of $\alpha 2$ or more and less than $\alpha 3$. The third strong electric field is a field intensity of $\alpha 3$ or more. $\alpha 1$, $\alpha 2$, and $\alpha 3$ are field intensity threshold values. $\alpha 2$ is greater than $\alpha 1$, and $\alpha 3$ is greater than $\alpha 2$. $\alpha 1$ is −140, for example. $\alpha 2$ is −130, for example. $\alpha 3$ is −124, for example.

The control section 100 classifies the weak electric field into a first weak electric field and a second weak electric field.

The first weak electric field is a field intensity of $\beta 1$ or more and less than $\beta 2$. The second weak electric field is a field intensity of $\beta 2$ or more and less than $\beta 3$. $\beta 1$, $\beta 2$, and $\beta 3$ are field intensity threshold values. $\beta 2$ is greater than $\beta 1$, and $\beta 3$ is greater than $\beta 2$. $\beta 1$ is −160 dBm, for example. $\beta 2$ is −150 dBm, for example. $\beta 3$ is −140 dBm, for example.

As shown in FIG. 10, the control section 100 determines that the environment is a first environment (OpenSky) based on the environment determination program 114 when the number of M2 satellites with the third strong electric field is eight or more and a GPS satellite other than the M2 satellites with the third strong electric field does not exist. The expression "the number of M2 satellites is eight" means that the number of GPS satellites tracked in the mode M2 is eight, for example.

FIGS. 11 to 16 are views illustrative of the reception environment.

The first environment is an environment in which no obstacle to the radio waves S1 and the like exists around the terminal 20, as shown in FIG. 11A, for example. Therefore, a multipath signal should not exist.

When the control section 100 has determined that the environment is the first environment, the control section 100 locates the position based on the positioning program 116 using all of the measurements of the GPS satellites 12a and the like, as shown in FIG. 10.

As shown in FIG. 10, the control section 100 determines that the environment is a second environment (semi-OpenSky) based on the environment determination program 114 when the M2 satellite with the third strong electric field, the M2 satellite with the second strong electric field, and the M3 satellite exist in combination.

For example, the second environment is an environment in which buildings 13A to 13D which may hinder the radio waves S1 and the like exist around the terminal 20, as shown in FIG. 11B. Therefore, at least the signal from the M3 satellite may be a multipath signal.

When the control section 100 has determined that the environment is the second environment, the control section 100 locates the position based on the positioning program 116 while excluding the measurements of the M3 satellite, as shown in FIG. 10. This allows the positioning accuracy to be increased as compared with the case of using the measurements of the M3 satellite.

As shown in FIG. 10, the control section 100 determines that the environment is a third environment (first multipath environment) based on the environment determination program 114 when the M2 satellite with the first strong electric field, the M2 satellite with the second strong electric field, and the M3 satellite exist in combination.

Figure 12:
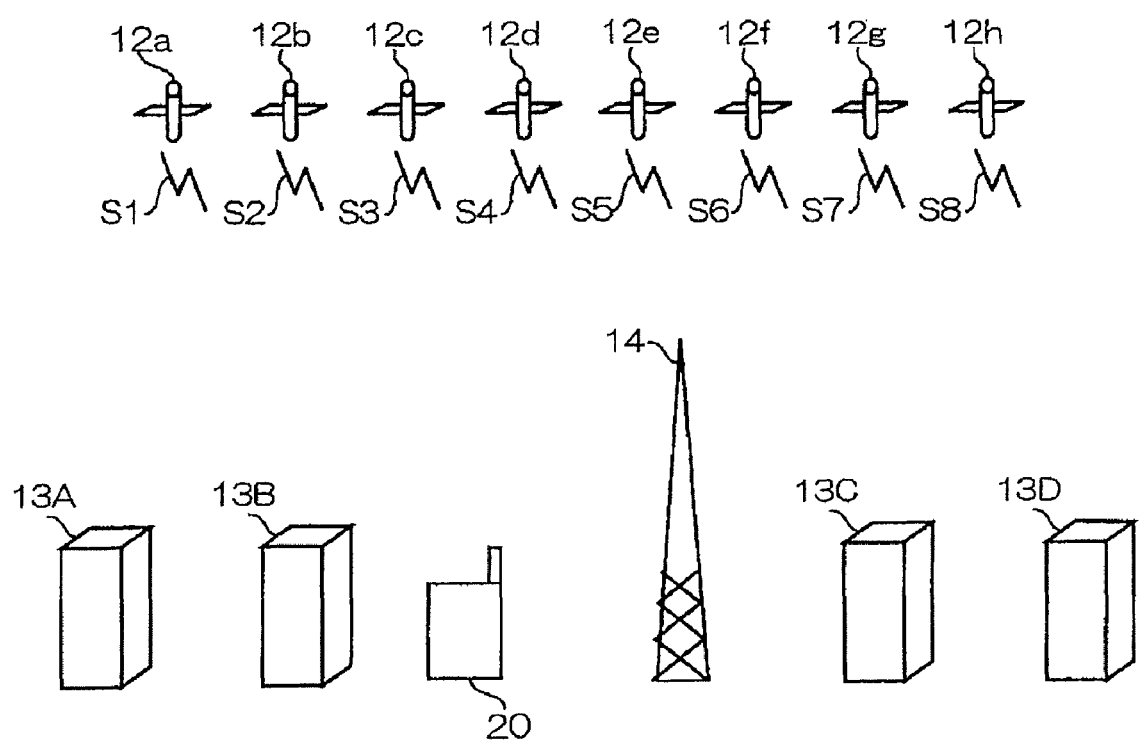
FIG. 12 is a view illustrative of a reception environment.

For example, the third environment is an environment in which the buildings 13A to 13D which may hinder the radio waves S1 and the like and a base station 14 as a noise signal transmission source exist around the terminal 20, as shown in FIG. 12. Therefore, the signal from the M3 satellite and the signal from the M2 satellite may be multipath signals.

When the control section 100 has determined that the environment is the third environment, the control section 100 locates the position based on the positioning program 116 while taking multipath measures, as shown in FIG. 10. For example, the control section 100 determines that the signal from the M2 satellite is a multipath signal when the direction of the signal from the M2 satellite differs from the direction of the radio wave S1 calculated from the ephemeris 152b, and excludes the measurements of the multipath signal. The control section 100 unconditionally excludes the measurements of the signal from the M3 satellite.

As shown in FIG. 10, the control section 100 determines that the environment is a fourth environment (bias environment) based on the environment determination program 114 when the M2 satellites with the third strong electric field and the M3 satellites with the second weak electric field exist in combination and the satellite constellation is biased. The control section 100 determines that the M2 satellite with the third strong electric field and the M3 satellite with the second weak electric field exist in combination when the number of M2 satellites with the third strong electric field is three or more and the number of M3 satellites with the second weak electric field is equal to or greater than the number of M2 satellites with the third strong electric field such as four or more (three or more in this case). The reasons therefor are as follows.

Specifically, it is estimated that six to nine GPS satellites can be always observed at a specific location. Therefore, it is estimated that three or four satellites with a strong signal strength (third strong electric field) and satellites with a rather weak signal strength (second weak electric field) in a number almost equal to the number of satellites with a strong signal strength exist in a situation in which one side is blocked or all sides are surrounded.

Figure 13A:
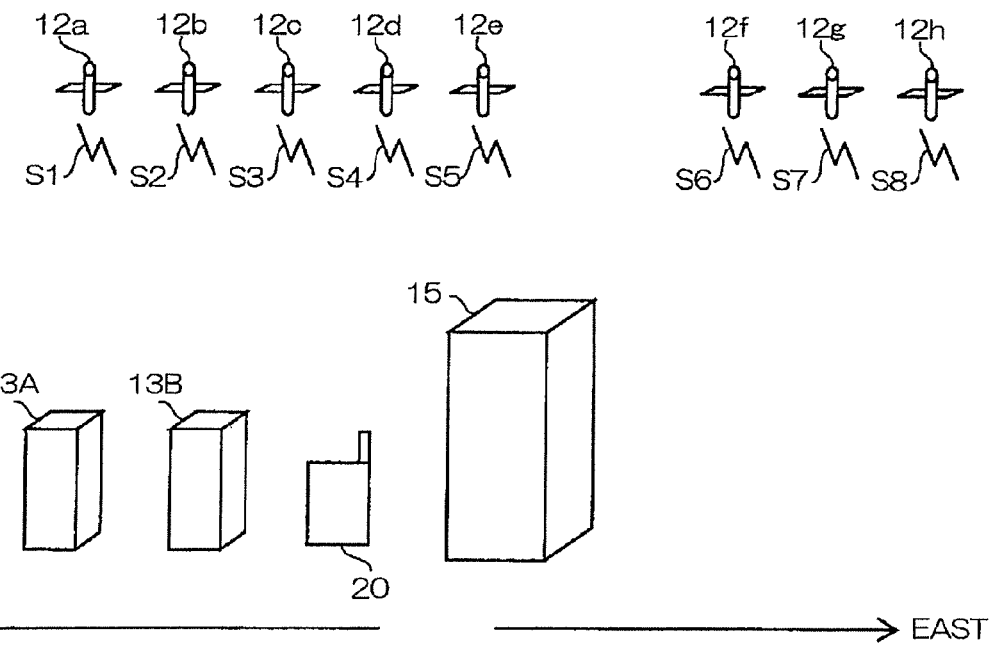
FIGS. 13A and 13B are views illustrative of a reception environment.

For example, the fourth environment is an environment in which the satellite constellation is biased to the west, as shown in FIG. 13A. This is because the radio waves S6, S7, and S8 from the GPS satellites 12*f*, 12*g*, and 12*h* do not reach the terminal 20 as direct waves due to the presence of a building 15, for example. Specifically, the fourth environment is one type of multipath environment.

When the control section 100 has determined that the environment is the fourth environment, the control section 100 locates the position based on the positioning program 116 while excluding the measurements of the GPS satellite 12*f*, 12*g*, and 12*h* in the direction opposite to the direction in which the satellites are biased, as shown in FIG. 10.

FIGS. 17, 18, and 19 are views illustrative of determination of the bias environment.

Figure 17A:
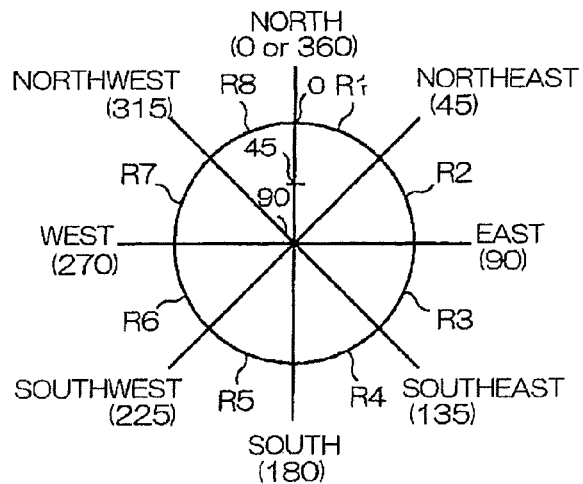
FIGS. 17A, 17B, and 17C are views illustrative of determination of a bias environment.

As shown in FIG. 17A, the azimuth belongs to one of eight angular regions R1 to R8 formed by equally dividing an angular range of 360 degrees around the position of the terminal 20 into eight regions, for example. In FIG. 17A, the distance from the center of the circle indicates the angle of elevation. The angle of elevation is 90 degrees at the center of the circle, and is 0 degrees at the circumference of the circle.

The angular regions may be formed by equally dividing an angular range of 360 degrees into sixteen regions instead of eight regions, differing from this embodiment, for example.

The control section 100 determines whether or not the satellites with a strong electric field are biased in some of the angular regions. The satellite with a strong electric field exemplifies a strong signal satellite. Specifically, the control section 100 determines whether or not the GPS satellites 12*a* and the like are biased based on the azimuth of the strong signal satellite.

Figure 17B:
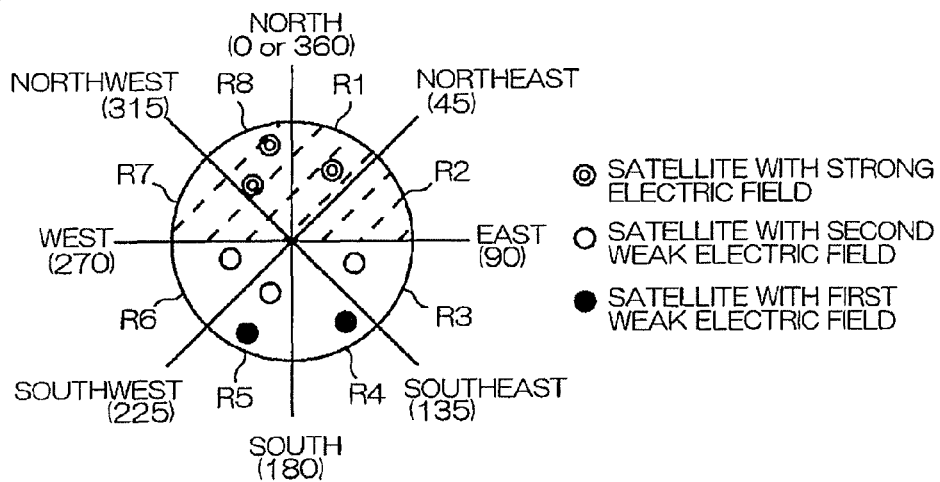

For example, the control section 100 starts determining whether or not the GPS satellites 12*a* and the like are biased when the number of satellites with a strong electric field is three and the number of satellites with the second weak electric field is three (i.e. when the number of satellites with a strong electric field is equal to the number of satellites with the second weak electric field), as shown in FIG. 17B.

Note that the control section 100 may start determining whether or not the GPS satellites 12*a* and the like are biased when the number of satellites with a strong electric field and the number of satellites with the second weak electric field are equal to or greater than a predetermined number (e.g. three), even if the number of satellites with a strong electric field is equal to the number of satellites with the second weak electric field, differing from this embodiment, for example. In this case, the number of satellites with a strong electric field may be three, and the number of satellites with the second weak electric field may be four, for example.

As shown in FIG. 17B, the control section 100 calculates the number of satellites with a strong electric field in the regions R1, R2, R7, and R8 (i.e. half of the total angular range). In the example shown in FIG. 17B, the number of satellites with a strong electric field is three. The region formed of the regions R1, R2, R7, and R8 is called a first semicircular region, and the region formed of the regions R1 and R8 is called a center region.

Figure 17C:
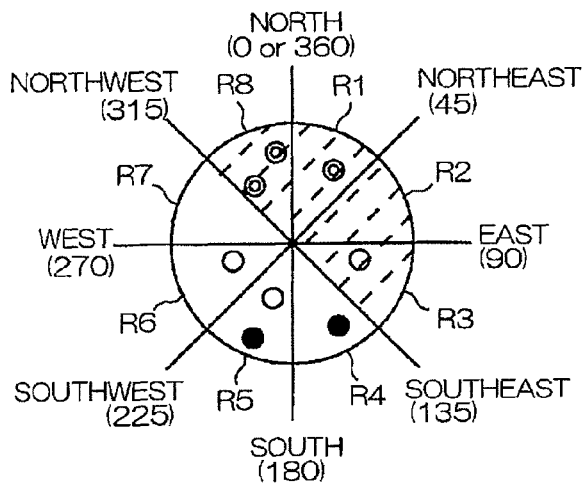

As shown in FIG. 17C, the control section 100 calculates the number of satellites with a strong electric field in a region obtained by excluding the region R7 from the first semicircular region and adding the region R3 to the first semicircular region (hereinafter called "second semicircular region"), for example. In the example shown in FIG. 17C, the number of satellites with a strong electric field is three.

Figure 18A:
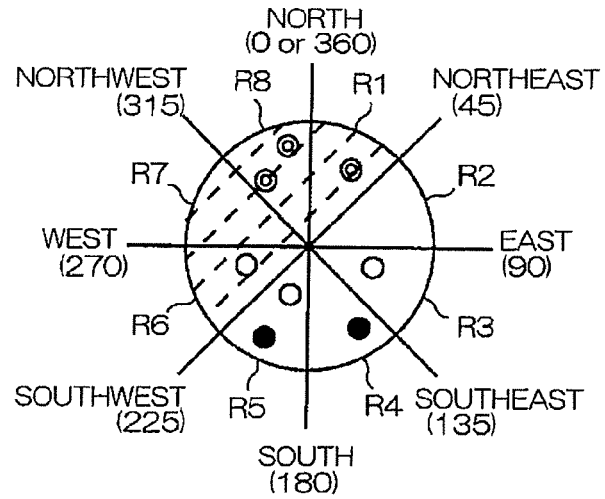
FIGS. 18A, 18B, and 18C are other views illustrative of determination of the bias environment.

As shown in FIG. 18A, the control section 100 calculates the number of satellites with a strong electric field in a region obtained by excluding the region R2 from the first semicircular region and adding the region R6 to the first semicircular region (hereinafter called "third semicircular region"), for example. In the example shown in FIG. 18A, the number of satellites with a strong electric field is three.

Figure 18B:
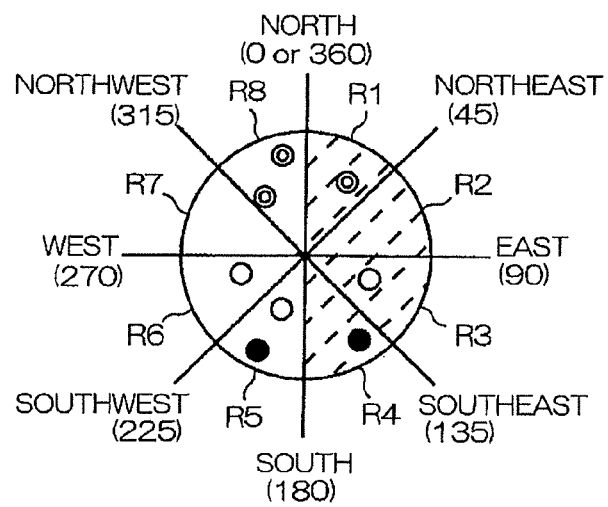

As shown in FIG. 18B, the control section 100 calculates the number of satellites with a strong electric field in a region obtained by excluding the region R8 from the second semicircular region (see FIG. 17C) and adding the region R4 to the second semicircular region (hereinafter called "fourth semicircular region"), for example. In the example shown in FIG. 18A, the number of satellites with a strong electric field is one.

Figure 18C:
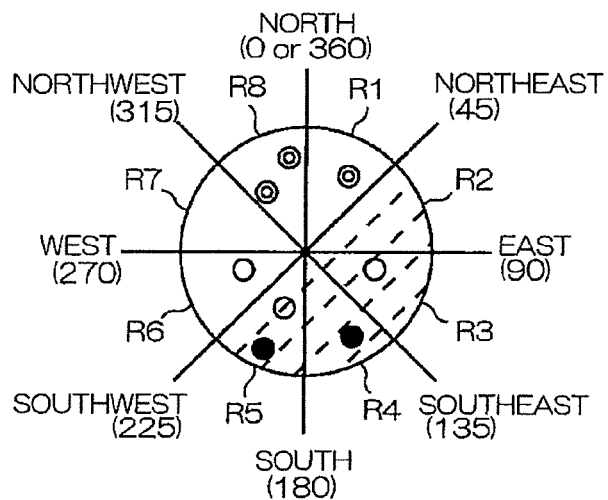

As shown in FIG. 18C, the control section 100 calculates the number of satellites with a strong electric field in a region obtained by excluding the region R1 from the fourth semicircular region (see FIG. 18B) and adding the region R5 to the fourth semicircular region (hereinafter called "fifth semicircular region"), for example. In the example shown in FIG. 18C, the number of satellites with a strong electric field is zero.

Figure 19A:
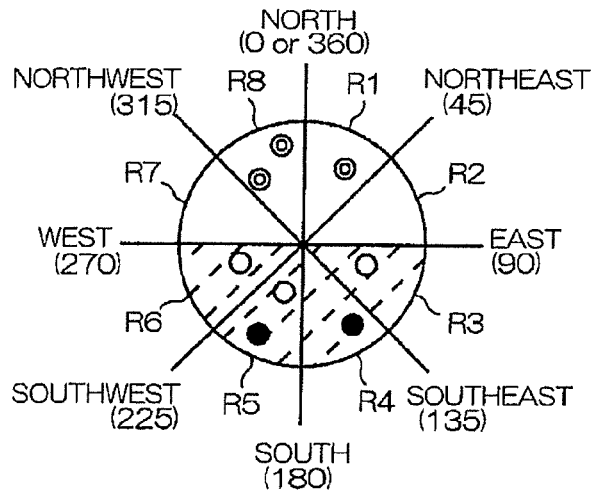
FIGS. 19A, 19B, and 19C are yet more views illustrative of determination of the bias environment.

As shown in FIG. 19A, the control section 100 calculates the number of satellites with a strong electric field in a region obtained by excluding the region R2 from the fifth semicircular region (see FIG. 18C) and adding the region R6 to the fifth semicircular region (hereinafter called "sixth semicircular region"), for example. In the example shown in FIG. 19A, the number of satellites with a strong electric field is zero.

Figure 19B:
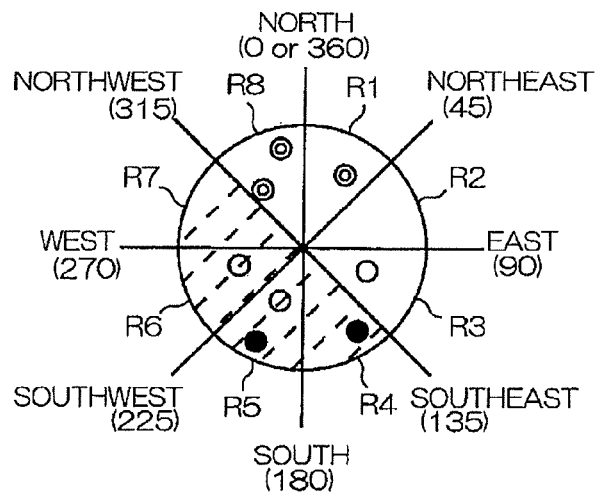

As shown in FIG. 19B, the control section 100 calculates the number of satellites with a strong electric field in a region obtained by excluding the region R3 from the sixth semicircular region (see FIG. 19A) and adding the region R7 to the sixth semicircular region (hereinafter called "seventh semicircular region"), for example. In the example shown in FIG. 19B, the number of satellites with a strong electric field is zero.

Figure 19C:
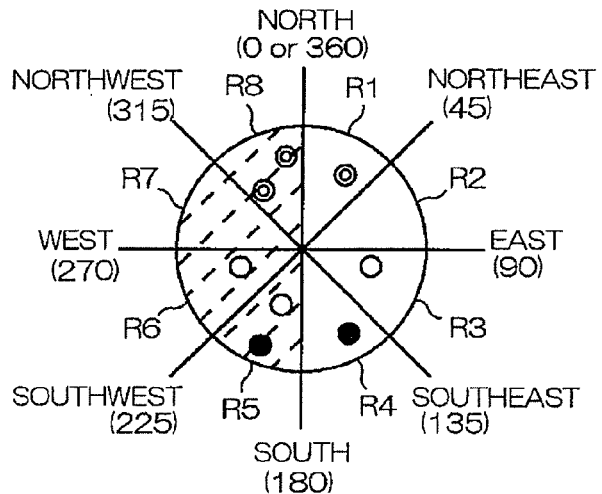

As shown in FIG. 19C, the control section 100 calculates the number of satellites with a strong electric field in a region obtained by excluding the region R4 from the seventh semicircular region (see FIG. 19B) and adding the region R8 to the seventh semicircular region (hereinafter called "eighth semicircular region"), for example. In the example shown in FIG. 19C, the number of satellites with a strong electric field is two.

The control section 100 calculates the number of satellites with a strong electric field while rotating the semicircular region with an angular range of 180 degrees by 45 degrees, as described above.

The control section 100 determines that the satellites are biased when a condition is satisfied whereby the number of satellites with a strong electric field is equal in three consecutive semicircular regions. The control section 100 determines that the biasing direction is the center direction of the center semicircular region of the three semicircular regions.

For example, the first region (see FIG. 17B), the second region (see FIG. 17C), and the third region (see FIG. 18A) are consecutive and include an equal number of satellites with a strong electric field. The center semicircular region is the first region. The center direction of the first region is the north.

Therefore, the control section 100 determines that the GPS satellites 12a and the like are biased to the north.

In this example, the first region exemplifies a center region, and the second region and the third region exemplify an adjacent region. The condition whereby the number of satellites with a strong electric field is equal in three consecutive semicircular regions exemplifies a first bias condition.

Figure 13B:
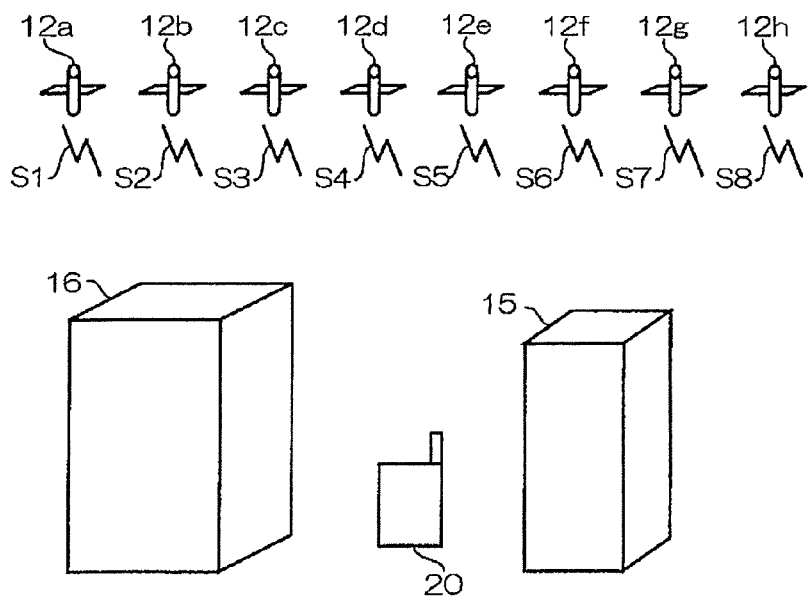

As shown in FIG. 10, the control section 100 determines that the environment is a fifth environment (valley environment) based on the environment determination program 114 when the M2 satellites with the third strong electric field and the M3 satellites with the second weak electric field exist in combination and the satellite constellation is not biased (when the condition whereby the number of satellites with a strong electric field is equal in three consecutive semicircular regions is not satisfied). The fifth environment is an environment in which the satellite constellation is not biased, but a valley is formed by the buildings 15 and 16, as shown in FIG. 13B, for example. This is similar to the situation in the Ginza, Tokyo, Japan, for example. The fifth environment is an environment in which a number of multipath signals easily occur. Specifically, the fifth environment is also one type of multipath environment.

When the control section 100 has determined that the environment is the fifth environment, the control section 100 locates the position based on the positioning program 116 while excluding the measurements of the GPS satellites 12a and the like in the direction of the obstacle and the measurements of the M3 satellite with the second weak electric field, as shown in FIG. 10.

Note that the control section 100 may locate the position while excluding the measurements of a satellite with an angle of elevation of 60 degrees or less, differing from this embodiment. The inventor of the invention has confirmed by experiment that the signal from a satellite with an angle of elevation of 60 degrees or less is a multipath signal in the fifth environment. An angle of elevation of 60 degrees or less exemplifies a predetermined low-angle-of-elevation range.

Figure 20:
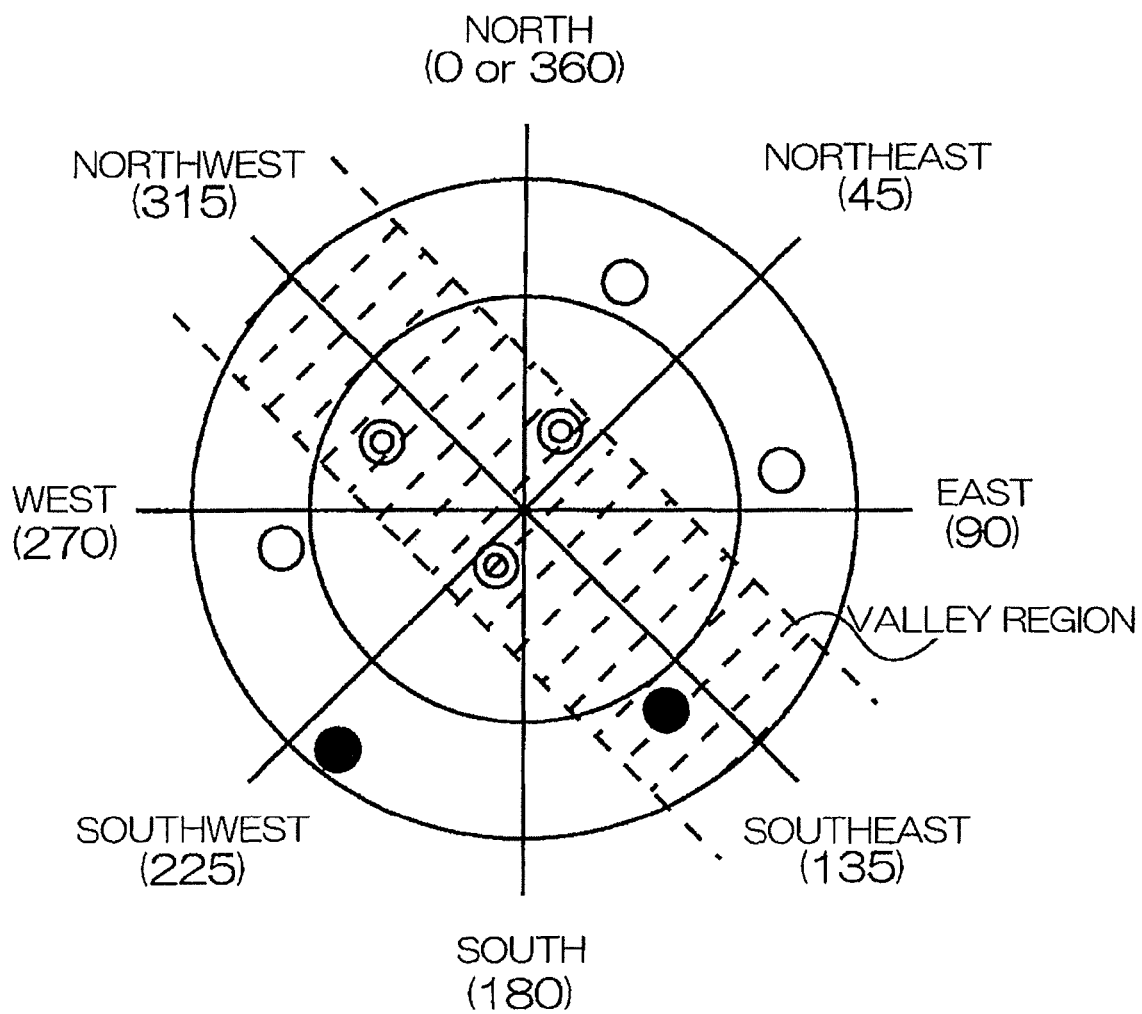
FIG. 20 is a view illustrative of determination of a valley environment.

FIG. 20 is a view illustrative of determination of the valley environment.

When the M2 satellites with the third strong electric field and the M3 satellites with the second weak electric field exist in almost equal numbers and the satellite constellation is not biased, the angle of elevation of the M2 satellite with the third strong electric field is higher than the angle of elevation of the M3 satellite with the second weak electric field, as shown in FIG. 17. The inventor of the invention has confirmed by experiment that such a relationship between the field intensity and the angle of elevation occurs in topography such as a valley.

Therefore, it may be determined that the environment is the valley environment when the M2 satellites with the third strong electric field and the M3 satellites with the second weak electric field exist in almost equal numbers and the satellite constellation is not biased.

As shown in FIG. 10, the control section 100 determines that the environment is a sixth environment (second multipath environment) based on the environment determination program 114 when the number of M3 satellites is larger than the number of M2 satellites.

For example, the sixth environment is an environment in which buildings such as 17A to 17E densely exist, as shown in FIG. 14. Or, the sixth environment is an environment such as a room with a window. In the sixth environment, the field intensity is weak, and a multipath signal easily occurs.

When the control section 100 has determined that the environment is the sixth environment, the control section 100 locates the position based on the positioning program 116 while taking multipath measures, as shown in FIG. 10.

As shown in FIG. 10, the control section 100 determines that the environment is a seventh environment (third multipath environment) based on the environment determination program 114 when the number of M2 satellites is only one and all of the remaining satellites are M3 satellites.

The seventh environment is an environment in a building 18 with only one window 18a, as shown in FIG. 15A, for example. In the seventh environment, the satellite in the direction of the window 18a can be tracked in the M2 mode, but the signals from other satellites may be multipath signals with high possibility.

When the control section 100 has determined that the environment is the seventh environment, the control section 100 locates the position based on the positioning program 116 while taking multipath measures, as shown in FIG. 10. For example, the control section 100 locates the position while correcting the measurements calculated from a composite wave of a direct wave and an indirect wave.

As shown in FIG. 10, the control section 100 determines that the environment is an eighth environment (second weak electric field) based on the environment determination program 114 when only the M3 satellites with the second strong electric field exist.

For example, the eighth environment is an environment in which the base station 14 and a power cable 18A as noise sources exist near the terminal 20, as shown in FIG. 15B.

When the control section 100 has determined that the environment is the eighth environment, the control section 100 locates the position based on the positioning program 116 using all the measurements, as shown in FIG. 10.

As shown in FIG. 10, the control section 100 determines that the environment is a ninth environment (first weak electric field) based on the environment determination program 114 when only the M3 satellite with the first strong electric field exist.

Figure 16:
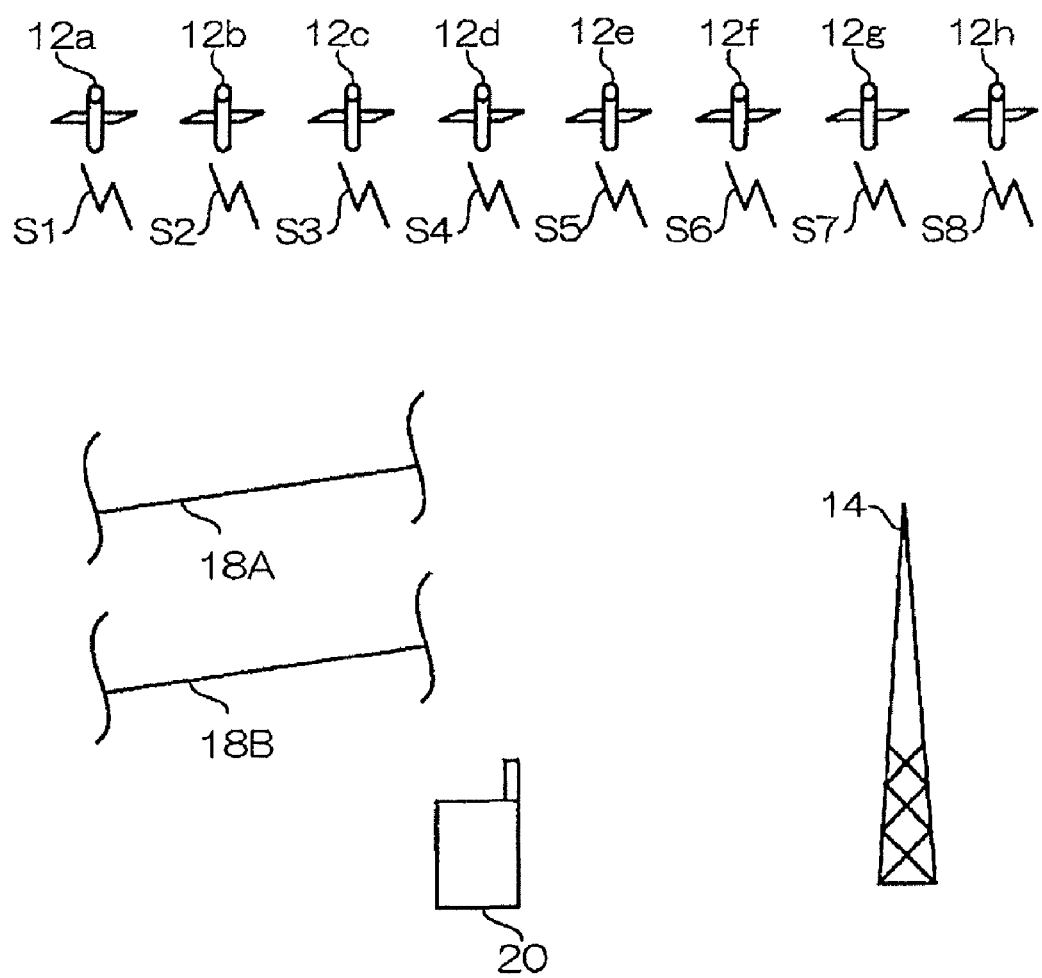
FIG. 16 is a view illustrative of a reception environment.

For example, the ninth environment is an environment in which the base station 14 and the power cables 18A and 18B as noise sources exist near the terminal 20, as shown in FIG. 16.

When the control section 100 has determined that the environment is the ninth environment, the control section 100 locates the position based on the positioning program 116 using all the measurements while increasing the accumulation time (incoherent time), as shown in FIG. 10.

The control section 100 calculates a located position P by the above-described positioning, and stores located position information 160 indicating the located position P in the second storage section 150.

The third environment, the fourth environment, the fifth environment, the sixth environment, and the seventh environment exemplify a multipath environment.

As shown in FIG. 6, the terminal 20 stores a located position output program 118 in the first storage section 110. The located position output program 118 is a program for causing the control section 100 to output the located position P to the display device 34 (see FIG. 5).

The terminal 20 is configured as described above.

As described above, the terminal 20 determines the reception environment (first environment to ninth environment) based on the number of GPS satellites 12a and the like corresponding to the C/A codes received in the modes M2 and M3.

This allows the terminal 20 to determine the reception environment without storing map data or communicating with the base station.

The terminal 20 determines whether or not to exclude the measurements or correct the measurements based on the reception environment, and then locates the position.

As described above, the terminal 20 can locate the position without storing map data or communicating with the base station while effectively using the satellite signals corresponding to various reception environments.

The configuration of the terminal 20 according to this embodiment has been described above. An operation example of the terminal 20 is described below mainly using FIG. 21.

Figure 21:
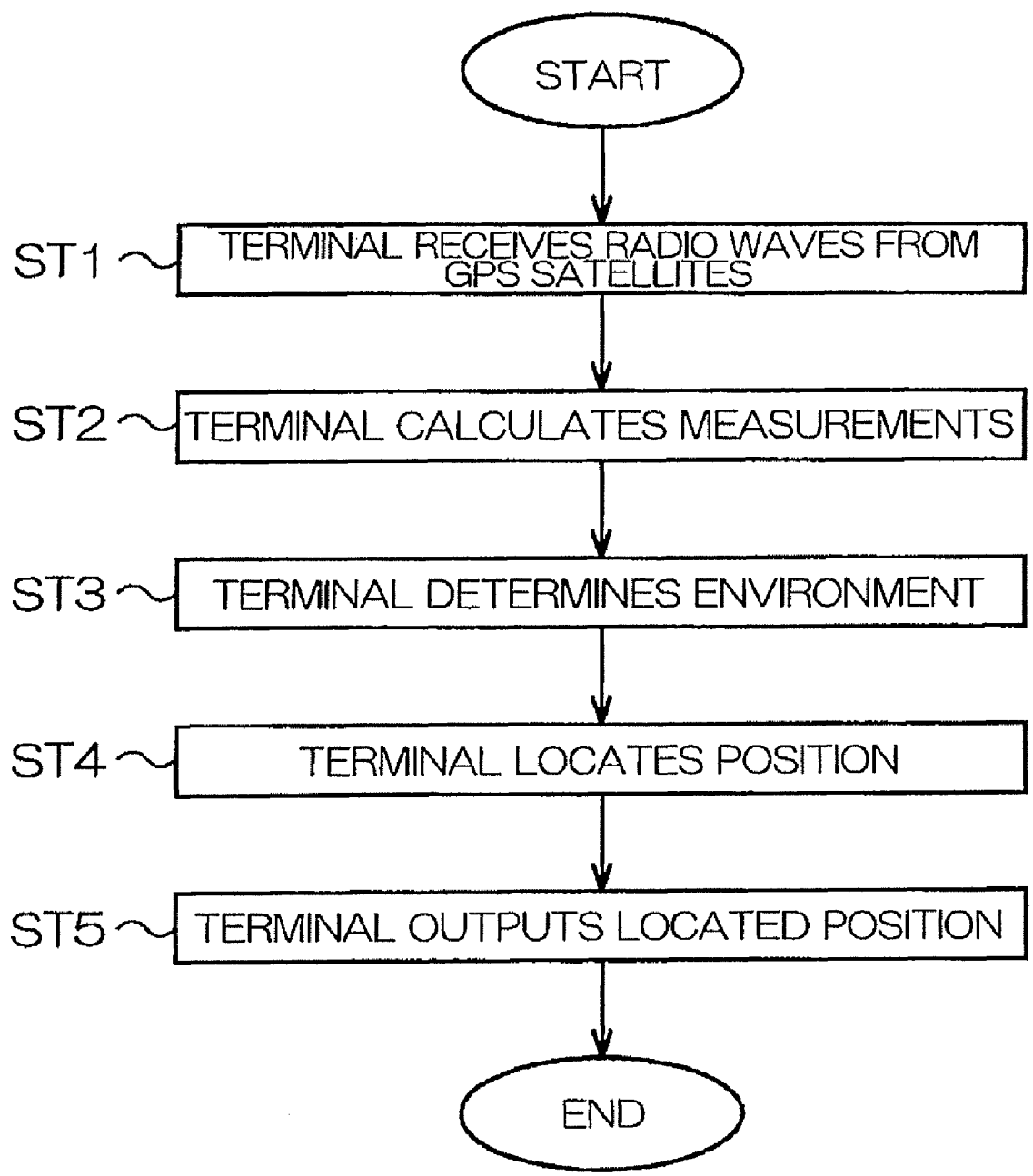
FIG. 21 is a schematic flowchart showing an operation example of the terminal.

FIG. 21 is a schematic flowchart showing an operation example of the terminal 20.

The terminal 20 receives the radio waves S1 and the like (step ST1 in FIG. 21), and calculates the measurements (ST2). The steps ST1 and ST2 exemplify a base value calculation step.

The terminal 20 determines the environment (step ST3). The step ST3 exemplifies a reception environment determination step.

The terminal 20 locates the position (step ST4). The step ST4 exemplifies a positioning step.

The terminal 20 outputs the located position P (step ST5).

The above steps ST1 to ST5 allow the terminal 20 to locate the position without storing map data or communicating with the base station while effectively using the satellite signals corresponding to various reception environments.

(Modification)

The terminal 20 may determine the fourth environment (bias environment) using another method.

FIG. 22 is a view illustrative of bias determination.

Figure 22A:
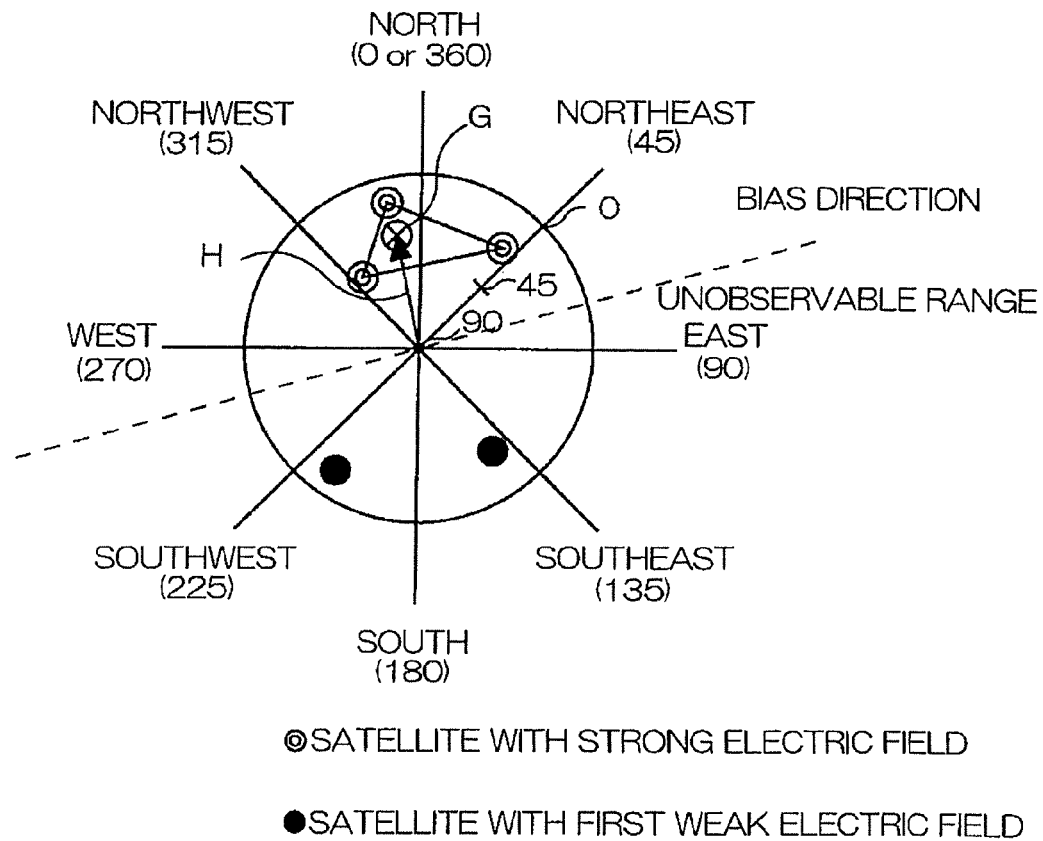
FIGS. 22A and 22B are views illustrative of determination of the bias environment.

FIG. 22A shows a state in which the satellites are biased.

As shown in FIG. 22A, the control section 100 of the terminal 20 calculates a center of gravity G of a figure formed by connecting the coordinates of each satellite specified by the angle of elevation and the azimuth. The control section 100 calculates a vector H from the terminal 20 toward the center of gravity G. The control section 100 determines that the GPS satellites 12a and the like are biased in the direction of the vector H when a condition is satisfied whereby the magnitude of the vector H (i.e. angle of elevation component) is less than 45 degrees, for example. A magnitude of less than 45 degrees exemplifies a predetermined magnitude.

The condition whereby the magnitude of the vector H (i.e. angle of elevation component) is less than 45 degrees exemplifies a second bias condition.

Figure 22B:
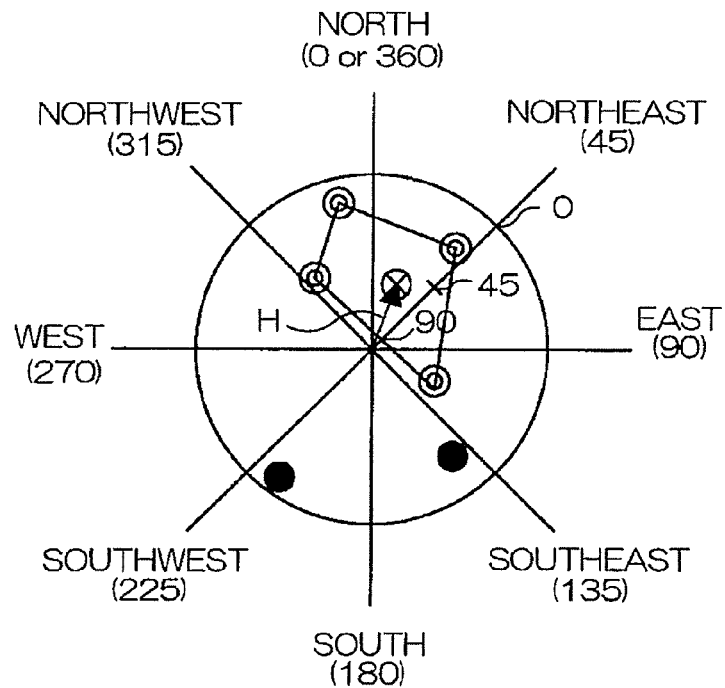

FIG. 22B shows a state in which the satellites are not biased.

As shown in FIG. 22B, the magnitude of the vector H is 45 degrees or more when the satellites are not biased.

Therefore, whether or not the satellites are biased can be determined based on the magnitude (angle of elevation component) of the vector H.

(Program, Computer-Readable Recording Medium, and the Like)

A program for controlling a positioning device may be provided which causes a computer to execute the azimuth calculation step, the reception environment determination step, and the like of the above-described operation example.

A computer-readable recording medium having such a program for controlling a positioning device and the like recorded thereon and the like may also be provided.

A program storage medium used to install the program for controlling a positioning device and the like in a computer to allow the program and the like to be executable by the computer may be implemented by a packaging medium such as a flexible disk such as a floppy disk (registered trademark), a compact disk read only memory (CD-ROM), a compact disk-recordable (CD-R), a compact disk-rewritable (CD-RW), or a digital versatile disk (DVD), a semiconductor memory, a magnetic disk, or a magnetooptical disk in which the program is stored temporarily or permanently, or the like.

The invention is not limited to the above embodiments. The above embodiments may be configured in combination.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A positioning device that has a long accumulation time mode and a short accumulation time mode as a tracking mode for an acquired satellite signal, the long accumulation time mode and the short accumulation time mode differing in accumulation time during a correlation process, the positioning device comprising:

a reception environment determination section that determines a reception environment of a satellite signal using a sub-class to which a field intensity of the acquired satellite signal belongs, and the tracking mode for the acquired satellite signal, when the field intensity of a received signal is classified as a strong electric field or a weak electric field, and the field intensity of each of the strong electric field and the weak electric field is classified into a plurality of sub-classes; and a positioning section that selects a satellite signal using the reception environment determined by the reception environment determination section, the sub-class to which the field intensity of the acquired satellite signal belongs, and the tracking mode for the acquired satellite signal, and locates a position using results of the correlation process on the selected satellite signal, the reception environment determination section classifying the field intensity of the strong electric field into three sub-classes, determining that the reception environment is an open-sky environment when the field intensities of all of the acquired satellite signals belong to the sub-class of the strong electric field having the strongest field intensity, and the tracking mode for all of the acquired satellite signals is the short accumulation time mode, and determining that the reception environment is a semi-open-sky environment when the acquired satellite signals include (1) a satellite signal which belongs to the sub-class of the strong electric field having the strongest field intensity and for which the tracking mode is the short accumulation time mode, (2) a satellite signal which belongs to the sub-class of the strong electric field having the medium field intensity and for which the tracking mode is the short accumulation time mode, and (3) a satellite signal which belongs to the sub-class of the strong electric field having the medium field intensity and for which the tracking mode is the long accumulation time mode, the positioning section locating a position using results of the correlation process on all of the acquired satellite signals when the reception environment has been determined to be the open-sky environment, and locating a position using results of the correlation process on (1) the satellite signal which belongs to the sub-class of the strong electric field having the strongest field intensity and for which the tracking mode is the short accumulation time mode, and results of the correlation process on (2) the satellite signal which belongs to the sub-class of the strong electric field having the medium field intensity and for which the tracking mode is the short accumulation time mode, when the reception environment has been determined to be the semi-open-sky environment, the reception environment determination section classifying the field intensity of the weak electric field into two sub-classes, determining that the reception environment is a first weak electric field environment when the field intensities of all of the acquired satellite signals belong to the sub-class of the weak electric field having the weaker field intensity, and the tracking mode for all of the acquired satellite signals is the long accumulation time mode, and determining that the reception environment is a second weak electric field environment when the field intensities of all of the acquired satellite signals belong to the sub-class of the weak electric field having the stronger field intensity, and the tracking mode for all of the acquired satellite signals is the long accumulation time mode, the positioning section performing the correlation process while increasing the accumulation time as compared with the long accumulation time mode, and locating a position when the reception environment has been determined to be the first weak electric field environment, and locating a position using results of the correlation process on all of the acquired satellite signals when the reception environment has been determined to be the second weak electric field environment.

2. A positioning device that has a long accumulation time mode and a short accumulation time mode as a tracking mode for an acquired satellite signal, the long accumulation time mode and the short accumulation time mode differing in accumulation time during a correlation process, the positioning device comprising:

a reception environment determination section that determines a reception environment of a satellite signal using a sub-class to which a field intensity of the acquired satellite signal belongs, and the tracking mode for the acquired satellite signal, when the field intensity of a received signal is classified as a strong electric field or a weak electric field, and the field intensity of each of the strong electric field and the weak electric field is classified into a plurality of sub-classes; and a positioning section that selects a satellite signal using the reception environment determined by the reception environment determination section, the sub-class to which the field intensity of the acquired satellite signal belongs, and the tracking mode for the acquired satellite signal, and locates a position using results of the correlation process on the selected satellite signal, the reception environment determination section determining that the reception environment is a satellite bias environment when the acquired satellite signals include (1) a satellite signal which belongs to the sub-class of the strong electric field having the strongest field intensity and for which the tracking mode is the short accumulation time mode, and (2) a satellite signal which belongs to the sub-class of the weak electric field having the stronger field intensity and for which the tracking mode is the long accumulation time mode, and a constellation of the satellites that have transmitted the received satellite signals is biased; and the positioning section locating a position using results of the correlation process on the satellite signals from the satellites excluding the satellites in a direction opposite to a direction in which the constellation is biased when the reception environment has been determined to be the satellite bias environment.

3. A positioning method that is by a positioning device that has a long accumulation time mode and a short accumulation time mode as a tracking mode for an acquired satellite signal, the long accumulation time mode and the short accumulation time mode differing in accumulation time during a correlation process, the method comprising:

determining a reception environment of a satellite signal using a sub-class to which a field intensity of the acquired satellite signal belongs, and the tracking mode for the acquired satellite signal, when the field intensity of a received signal is classified as a strong electric field or a weak electric field, and the field intensity of each of the strong electric field and the weak electric field is classified into a plurality of sub-classes; and selecting a satellite signal using the reception environment, the sub-class to which the field intensity of the acquired satellite signal belongs, and the tracking mode for the acquired satellite signal, and locating a position using results of the correlation process on the selected satellite signal, the determining of the reception environment including
classifying the field intensity of the strong electric field into three sub-classes, determining that the reception environment is an open-sky environment when the field intensities of all of the acquired satellite signals belong to the sub-class of the strong electric field having the strongest field intensity, and the tracking mode for all of the acquired satellite signals is the short accumulation time mode, and determining that the reception environment is a semi-open-sky environment when the acquired satellite signals include (1) a satellite signal which belongs to the sub-class of the strong electric field having the strongest field intensity and for which the tracking mode is the short accumulation time mode, (2) a satellite signal which belongs to the sub-class of the strong electric field having the medium field intensity and for which the tracking mode is the short accumulation time mode, and (3) a satellite signal which belongs to the sub-class of the strong electric field having the medium field intensity and for which the tracking mode is the long accumulation time mode, the locating of a position including
locating a position using results of the correlation process on all of the acquired satellite signals when the reception environment has been determined to be the open-sky environment, and locating a position using results of the correlation process on (1) the satellite signal which belongs to the sub-class of the strong electric field having the strongest field intensity and for which the tracking mode is the short accumulation time mode, and results of the correlation process on (2) the satellite signal which belongs to the sub-class of the strong electric field having the medium field intensity and for which the tracking mode is the short accumulation time mode, when the reception environment has been determined to be the semi-open-sky environment, the determining of the reception environment including
classifying the field intensity of the weak electric field into two sub-classes,
determining that the reception environment is a first weak electric field environment when the field intensities of all of the acquired satellite signals belong to the sub-class of the weak electric field having the weaker field intensity, and the tracking mode for all of the acquired satellite signals is the long accumulation time mode, and
determining that the reception environment is a second weak electric field environment when the field intensities of all of the acquired satellite signals belong to the sub-class of the weak electric field having the stronger field intensity, and the tracking mode for all of the acquired satellite signals is the long accumulation time mode, and the locating of a position including
performing the correlation process while increasing the accumulation time as compared with the long accumulation time mode, and locating a position when the reception environment has been determined to be the first weak electric field environment, and
locating a position using results of the correlation process on all of the acquired satellite signals when the reception environment has been determined to be the second weak electric field environment.

4. A positioning method that is implemented by a positioning device that has a long accumulation time mode and a short accumulation time mode as a tracking mode for an acquired satellite signal, the long accumulation time mode and the short accumulation time mode differing in accumulation time during a correlation process, the method comprising:

determining a reception environment of a satellite signal using a sub-class to which a field intensity of the acquired satellite signal belongs, and the tracking mode for the acquired satellite signal, when the field intensity of a received signal is classified as a strong electric field or a weak electric field, and the field intensity of each of the strong electric field and the weak electric field is classified into a plurality of sub-classes; and selecting a satellite signal using the reception environment, the sub-class to which the field intensity of the acquired satellite signal belongs, and the tracking mode for the acquired satellite signal, and locating a position using results of the correlation process on the selected satellite signal, the determining of the reception environment including determining that the reception environment is a satellite bias environment when the acquired satellite signals include (1) a satellite signal which belongs to the sub-class of the strong electric field having the strongest field intensity and for which the tracking mode is the short accumulation time mode, and (2) a satellite signal which belongs to the sub-class of the weak electric field having the stronger field intensity and for which the tracking mode is the long accumulation time mode, and a constellation of the satellites that have transmitted the received satellite signals is biased, the locating a position including locating a position using results of the correlation process on the satellite signals from the satellites excluding the satellites in a direction opposite to a direction in which the constellation is biased when the reception environment has been determined to be the satellite bias environment.

\* \* \* \* \*